United States Patent
Huang et al.

(10) Patent No.: US 11,041,626 B2
(45) Date of Patent: Jun. 22, 2021

(54) COMBUSTION CHAMBER SYSTEM AND A METHOD OF OPERATING A COMBUSTION CHAMBER SYSTEM

(71) Applicant: ROLLS-ROYCE plc, London (GB)

(72) Inventors: Hua Wei Huang, Derby (GB); Jochen Rupp, Derby (GB); Michael Whiteman, Derby (GB)

(73) Assignee: ROLLS-ROYCE plc, London (GB)

( * ) Notice: Subject to any disclaimer, the term of this patent is extended or adjusted under 35 U.S.C. 154(b) by 709 days.

(21) Appl. No.: 15/457,456

(22) Filed: Mar. 13, 2017

(65) Prior Publication Data
US 2017/0268782 A1  Sep. 21, 2017

(30) Foreign Application Priority Data
Mar. 15, 2016  (GB) .................................... 1604379

(51) Int. Cl.
*F23R 3/00*  (2006.01)
*F23R 3/34*  (2006.01)
(Continued)

(52) U.S. Cl.
CPC ................ *F23R 3/343* (2013.01); *F02C 9/26* (2013.01); *F02C 9/28* (2013.01); *F02C 9/32* (2013.01);
(Continued)

(58) Field of Classification Search
CPC ...... F02C 9/26; F02C 9/28; F02C 9/32; F02C 7/22; F23R 3/343; F23R 3/346; F02D 2250/36
See application file for complete search history.

(56) References Cited

U.S. PATENT DOCUMENTS

| 4,411,137 A | 10/1983 | Pearce |
| 4,548,032 A | 10/1985 | Sepulveda et al. |

(Continued)

FOREIGN PATENT DOCUMENTS

| EP | 1180646 A1 | 2/2002 |
| EP | 2584176 A2 | 4/2013 |

(Continued)

OTHER PUBLICATIONS

Aug. 30, 2016 Search Report issued in Great Britain Patent Application No. 1604379.6.
(Continued)

*Primary Examiner* — Katheryn A Malatek
(74) *Attorney, Agent, or Firm* — Oliff PLC

(57) ABSTRACT

A combustion chamber system has pilot and main fuel manifolds, and pilot and main fuel nozzles. Each pilot nozzle is connected to the pilot manifold. Each main nozzle is connected to the main manifold. A greater total amount of fuel is supplied to the pilot nozzles than to the main nozzles. A greater amount of fuel is supplied to pilot nozzles at, or in, a first region of the combustion chamber than to pilot fuel nozzles at, or in, a second region. A greater amount of fuel is supplied to the main nozzles at, or in, the first region than to the main nozzles at, or in, the second to improve combustion efficiency, weak extinction and relight of the combustion chamber in a first mode of operation. A greater total amount of fuel is supplied to the main nozzles than to the pilot nozzles in a second mode of operation.

18 Claims, 9 Drawing Sheets

(51) Int. Cl.
*F02C 9/28* (2006.01)
*F02C 9/32* (2006.01)
*F23N 1/00* (2006.01)
*F02C 9/26* (2006.01)
*F23R 3/50* (2006.01)

(52) U.S. Cl.
CPC .............. *F23N 1/002* (2013.01); *F23R 3/346* (2013.01); *F23R 3/50* (2013.01); *F23N 2237/02* (2020.01)

(56) References Cited

U.S. PATENT DOCUMENTS

| | | | |
|---|---|---|---|
| 4,817,389 A * | 4/1989 | Holladay | F02C 7/228 60/739 |
| 4,862,693 A | 9/1989 | Batakis et al. | |
| 5,884,483 A * | 3/1999 | Munro | F02C 7/22 60/734 |
| 6,513,334 B2 | 2/2003 | Varney | |
| 8,166,762 B2 | 5/2012 | Scully | |
| 8,347,599 B2 | 1/2013 | Scully | |
| 8,429,892 B2 | 4/2013 | Tentorio | |
| 8,925,322 B2 | 1/2015 | Scully et al. | |
| 2002/0020173 A1 * | 2/2002 | Varney | F23C 6/047 60/737 |
| 2003/0014979 A1 | 1/2003 | Summerfield et al. | |
| 2005/0198964 A1 * | 9/2005 | Myers, Jr. | F23R 3/343 60/739 |
| 2010/0275602 A1 * | 11/2010 | Cant | F23C 7/004 60/737 |
| 2011/0203284 A1 | 8/2011 | Ritland et al. | |
| 2012/0148962 A1 | 6/2012 | Bernero et al. | |

FOREIGN PATENT DOCUMENTS

| | | |
|---|---|---|
| EP | 2829805 A1 | 1/2015 |
| EP | 2853720 A2 | 4/2015 |
| GB | 2378224 A | 2/2003 |
| GB | 2458213 A | 9/2009 |
| GB | 2486545 A | 6/2012 |
| JP | 2010-196982 A | 9/2010 |

OTHER PUBLICATIONS

Aug. 4, 2017 Search Report issued in European Patent Application No. 17160489.

* cited by examiner

COMBUSTION CHAMBER SYSTEM AND A METHOD OF OPERATING A COMBUSTION CHAMBER SYSTEM

The present disclosure concerns a combustion chamber system and a method of operating a combustion chamber system and in particular to a gas turbine engine combustion chamber system and a method of operating a gas turbine engine combustion chamber system.

Gas turbine engine combustion chambers have been developed to limit the production of undesirable combustion product components such as carbon monoxide (CO), carbon dioxide ($CO_2$), unburned hydrocarbons (UHC), nitrogen oxides (NOX, e.g. NO, $NO_2$, $N_2O_3$), smoke and soot particles. Different combustion chamber designs have been developed to minimise the production of these undesirable combustion product components. One of these combustion chamber designs uses staged combustion of the fuel. A staged combustion chamber includes pilot, or primary, stage fuel nozzles and main, or secondary, stage fuel nozzles. At low speed and/or low power conditions fuel is supplied to the pilot fuel nozzles only. At low speed and/or low power conditions the fuel is shared equally between the pilot fuel nozzles. At high speed and/or high power conditions fuel is supplied to the pilot fuel nozzles and the main fuel nozzles to maintain the undesirable combustion products within certain desired limits. At high speed and/or high power conditions a first amount of fuel is shared equally between the pilot fuel nozzles and a second amount of fuel is shared equally between the main fuel nozzles. The pilot fuel nozzles are designed so as to maintain combustion in the combustion chamber during low speed and/or low power conditions and the main fuel nozzles are designed to optimise combustion efficiency at cruise conditions and to minimise NOX.

However, the use of the pilot fuel nozzles only during low speeds and/or low power conditions does not produce uniform combustion efficiency over all low speeds and/or low power conditions and hence may lead to lower combustion efficiency at some low speeds and/or low power conditions than other low speeds and/or low power conditions.

Low power conditions refers to low exit temperature at the combustion chamber, for example, in the case of an aero gas turbine engine, during idle, hold, approach and descent.

The present disclosure seeks to provide a method of operating a combustion chamber system and a combustion chamber system which reduces or overcomes the above mentioned problems.

Accordingly a first aspect of the present disclosure provides a method of operating a combustion chamber system, the combustion system comprising an annular combustion chamber, a pilot fuel manifold, at least one main fuel manifold, a plurality of circumferentially arranged pilot fuel nozzles and a plurality of circumferentially arranged main fuel nozzles, each pilot fuel nozzle being fluidly connected to the pilot fuel manifold and each main fuel nozzle being fluidly connected to the at least one main fuel manifold, the method comprising supplying a greater total amount of fuel to the pilot fuel nozzles than to the main fuel nozzles and supplying a greater amount of fuel to the pilot fuel nozzle or the pilot fuel nozzles at, or in, a first circumferential region of the annular combustion chamber than to the pilot fuel nozzle or the pilot fuel nozzles at, or in, a second circumferential region of the annular combustion chamber and supplying a greater amount of fuel to the main fuel nozzle or the main fuel nozzles at, or in, the first circumferential region of the annular combustion chamber than to the main fuel nozzle or the main fuel nozzles at, or in, the second circumferential region of the annular combustion chamber in a first mode of operation, and supplying a greater total amount of fuel to the main fuel nozzles than to the pilot fuel nozzles and supplying substantially the same amount of fuel to each of the pilot fuel nozzles and supplying substantially the same amount of fuel to each of the main fuel nozzles in a second mode of operation.

The method may comprise providing fuel flow restrictors in the pilot fuel nozzles and fuel flow restrictors in the main fuel nozzles, the fuel flow restrictors in the pilot fuel nozzles at, or in, the first circumferential region of the annular combustion chamber being arranged to open at a first predetermined pressure and the pilot fuel nozzles at, or in, the second circumferential region of the annular combustion chamber being arranged to open at a second predetermined pressure and the first predetermined pressure is less than the second predetermined pressure, the fuel flow restrictors in the main fuel nozzles at, or in, the first circumferential region of the annular combustion chamber being arranged to open at a third predetermined pressure and the main fuel nozzles at, or in, the second circumferential region of the annular combustion chamber being arranged to open at a fourth predetermined pressure and the third predetermined pressure is less than the fourth predetermined pressure.

The method may comprise supplying a greater amount of fuel to the pilot fuel nozzle or the pilot fuel nozzles at, or in, a bottom region of the annular combustion chamber than to the pilot fuel nozzle or the pilot fuel nozzles at, or in, a top region of the annular combustion chamber and supplying a greater amount of fuel to the main fuel nozzle or the main fuel nozzles at, or in, the bottom region of the annular combustion chamber than to the main fuel nozzle or main fuel nozzles at, or in, the top region of the annular combustion chamber in a first mode of operation.

The method may comprise providing fuel flow restrictors in the pilot fuel nozzles and fuel flow restrictors in the main fuel nozzles, the fuel flow restrictors in the pilot fuel nozzles at, or in, the bottom region of the annular combustion chamber being arranged to open at a first predetermined pressure and the pilot fuel nozzles at, or in, the top region of the annular combustion chamber being arranged to open at a second predetermined pressure and the first predetermined pressure is less than the second predetermined pressure, the fuel flow restrictors in the main fuel nozzles at, or in, the bottom region of the annular combustion chamber being arranged to open at a third predetermined pressure and the main fuel nozzles at, or in, the top region of the annular combustion chamber being arranged to open at a fourth predetermined pressure and the third predetermined pressure is less than the fourth predetermined pressure.

The method may comprise supplying progressively smaller amounts of fuel to the pilot fuel nozzles between the pilot fuel nozzle or the pilot fuel nozzles at, or in, the bottom region of the annular combustion chamber and the pilot fuel nozzle or the pilot fuel nozzles at, or in, the top region of the annular combustion chamber and supplying progressively smaller amounts of fuel to the main fuel nozzles between the main fuel nozzle or the main fuel nozzles at, or in, the bottom region of the annular combustion and the main fuel nozzle or main fuel nozzles at, or in, the top region of the annular combustion chamber in the first mode of operation.

The fuel flow restrictors in the pilot fuel nozzles between the bottom region of the annular combustion chamber and the top region of the annular combustion chamber being arranged to open at a fifth predetermined pressure and the fifth predetermined pressure is greater than the first predetermined pressure and less than the second predetermined pressure, the fuel flow restrictors in the main fuel nozzles between the bottom region of the annular combustion chamber and the top region of the annular combustion chamber being arranged to open at a sixth predetermined pressure and the sixth predetermined pressure is greater than the third predetermined pressure and less than the fourth predetermined pressure.

There may be a single main fuel manifold and each main fuel nozzle being fluidly connected to the single main fuel manifold, the method comprising supplying a greater amount of fuel to the pilot fuel nozzle or the pilot fuel nozzles at, or in, the bottom region of the annular combustion chamber than to the pilot fuel nozzle or the pilot fuel nozzles at, or in, the top region of the annular combustion chamber and supplying a greater amount of fuel to the main fuel nozzle or the main fuel nozzles at, or in, the bottom region of the annular combustion chamber than to the main fuel nozzle or the main fuel nozzles at, or in, the top region of the annular combustion chamber in a first mode of operation.

The method may comprise supplying 70% to 90% of the fuel to the pilot fuel nozzles and supplying 30% to 10% of the fuel to the main fuel nozzles in the first mode of operation. The method may comprise supplying 80% of the fuel to the pilot fuel nozzles and supplying 20% of the fuel to the main fuel nozzles in the first mode of operation.

The method may comprise supplying 5 to 25% of the fuel to the pilot fuel nozzles and supplying 95% to 75% of the fuel to the main fuel nozzles in the second mode of operation. The method may comprise supplying 20% of the fuel to the pilot fuel nozzles and supplying 80% of the fuel to the main fuel nozzles in the second mode of operation.

There may be a first main fuel manifold and a second main fuel manifold, a plurality of main fuel nozzle being fluidly connected to the first main fuel manifold and a plurality of main fuel nozzles being fluidly connected to the second main fuel manifold.

The first main fuel manifold may be arranged around an upper half of the annular combustion chamber and the second fuel manifold may be arranged around a lower half of the annular combustion chamber.

The method may comprise supplying a greater amount of fuel to the pilot fuel nozzle or the pilot fuel nozzles at, or in, the bottom region of the annular combustion chamber than to the pilot fuel nozzle or the pilot fuel nozzles at, or in, the top region of the annular combustion chamber, and supplying a greater amount of fuel from the second main fuel manifold to the associated main fuel nozzle or the associated main fuel nozzles at, or in, the bottom region of the annular combustion chamber than to the associated main fuel nozzle or the associated main fuel nozzles nearer to the top region of the annular combustion chamber and supplying no fuel from the first fuel manifold to the associated main fuel nozzles in a first mode of operation.

The method may comprise supplying 70% to 90% of the fuel to the pilot fuel nozzles and supplying 30% to 10% of the fuel to the main fuel nozzles in the first mode of operation. The method may comprise supplying 80% of the fuel to the pilot fuel nozzles and supplying 20% of the fuel to the main fuel nozzles in the first mode of operation.

The method may comprise supplying 5 to 25% of the fuel to the pilot fuel nozzles and supplying 95% to 75% of the fuel to the main fuel nozzles in the second mode of operation. The method may comprise supplying 20% of the fuel to the pilot fuel nozzles and supplying 80% of the fuel to the main fuel nozzles in the second mode of operation.

The method may comprise supplying a greater amount of fuel to the pilot fuel nozzle or the pilot fuel nozzles at, or in, the bottom region of the annular combustion chamber than to the pilot fuel nozzle or the pilot fuel nozzles at, or in, the top region of the annular combustion chamber, and supplying a greater amount of fuel from the first main fuel manifold to the associated main fuel nozzle or the associated main fuel nozzles nearer to the bottom region of the annular combustion chamber than to the associated main fuel nozzle or the associated main fuel nozzles at the top region of the annular combustion chamber and supplying no fuel from the second fuel manifold to the associated main fuel nozzles in a first mode of operation.

The method may comprise supplying 70% to 90% of the fuel to the pilot fuel nozzles and supplying 30% to 10% of the fuel to the main fuel nozzles in the first mode of operation. The method may comprise supplying 80% of the fuel to the pilot fuel nozzles and supplying 20% of the fuel to the main fuel nozzles in the first mode of operation.

The method may comprise supplying 5 to 25% of the fuel to the pilot fuel nozzles and supplying 95% to 75% of the fuel to the main fuel nozzles in the second mode of operation. The method may comprise supplying 20% of the fuel to the pilot fuel nozzles and supplying 80% of the fuel to the main fuel nozzles in the second mode of operation.

The method may comprise supplying a greater amount of fuel to the pilot fuel nozzle or the pilot fuel nozzles at, or in, the bottom region of the annular combustion chamber than to the pilot fuel nozzle or the pilot fuel nozzles at, or in, the top region of the annular combustion chamber, and supplying a greater amount of fuel from the second main fuel manifold to the associated main fuel nozzle or the associated main fuel nozzles at, or in, the bottom region of the annular combustion chamber than to the associated main fuel nozzle or associated main fuel nozzles nearer to the top region of the annular combustion chamber and supplying a greater amount of fuel from the first main fuel manifold to the associated main fuel nozzle or the associated main fuel nozzles nearer to the bottom region of the annular combustion chamber than to the associated main fuel nozzle or the associated main fuel nozzles at the top region of the annular combustion chamber in a first mode of operation.

The method may comprise supplying 70% to 90% of the fuel to the pilot fuel nozzles and supplying 15% to 5% of the fuel from the first fuel manifold to the associated main fuel nozzles and supplying 15% to 5% of the fuel from the second fuel manifold to the associated main fuel nozzles in the first mode of operation. The method may comprise supplying 80% of the fuel to the pilot fuel nozzles, supplying 10% of the fuel from the first main fuel manifold to the associated main fuel nozzles and supplying 10% of the fuel from the second main fuel manifold to the associated main fuel nozzles in the first mode of operation.

The method may comprise supplying 5 to 25% of the fuel to the pilot fuel nozzles and supplying 95% to 75% of the fuel to the main fuel nozzles in the second mode of operation. The method may comprise supplying 20% of the fuel to the pilot fuel nozzles and 80% of the fuel to the main fuel nozzles in the second mode of operation.

The ratio of the amount of fuel supplied to the pilot fuel nozzle or the pilot fuel nozzles at, or in, the second circumferential region of the annular combustion chamber to the amount of fuel supplied to the main fuel nozzle or the main fuel nozzles at, or in, the second circumferential region of the annular combustion chamber is greater than the ratio of the amount of fuel supplied to the pilot fuel nozzle or the pilot fuel nozzles at, or in, the first circumferential region of the annular combustion chamber to the amount of fuel supplied to the main fuel nozzle or the main fuel nozzles at, or in, the first circumferential of the annular combustion chamber in the first mode of operation.

The ratio of the amount of fuel supplied to the pilot fuel nozzle or the pilot fuel nozzles at, or in, the top region of the annular combustion chamber to the amount of fuel supplied to the main fuel nozzle or the main fuel nozzles at, or in, the top region of the annular combustion chamber is greater than the ratio of the amount of fuel supplied to the pilot fuel nozzle or the pilot fuel nozzles at, or in, the bottom region of the annular combustion chamber to the amount of fuel supplied to the main fuel nozzle or the main fuel nozzles at, or in, the bottom region of the annular combustion chamber in the first mode of operation.

The axis of the annular combustion chamber may be arranged substantially horizontally.

The annular combustion chamber may comprise an annular upstream end wall, a radially outer annular wall, a radially inner annular wall and a plurality of fuel injectors, the annular upstream end wall having a plurality of circumferentially spaced apertures, each aperture in the annular upstream end wall having a respective one of the plurality of fuel injectors, each fuel injector comprising one of the pilot fuel nozzles and one of the main fuel nozzles.

The combustion chamber may comprise a plurality of circumferentially spaced fuel injectors, each fuel injector comprising one of the pilot fuel nozzles and one of the main fuel nozzles.

The annular combustion chamber may comprises a double annular combustion chamber comprising a first annular upstream end wall, a second annular upstream end wall, a radially outer annular wall, a radially outer intermediate annular wall, a radially inner intermediate annular wall, a radially inner annular wall and a plurality of pilot fuel nozzles and a plurality of main fuel nozzles, the upstream ends of the radially outer annular wall and the radially outer intermediate annular wall being connected to the first annular upstream end wall, the upstream ends of the radially inner intermediate annular wall and the radially inner annular wall being connected to the second annular upstream end wall, the downstream end of the radially outer intermediate annular wall being connected to the downstream end of the radially inner intermediate annular wall, the first annular upstream end wall having a plurality of circumferentially spaced apertures, the second annular upstream end wall having a plurality of circumferentially spaced apertures, each aperture in the first annular upstream end wall having a respective one of the plurality of pilot fuel nozzles and each aperture in the second annular upstream end wall having a respective one of the plurality of main fuel nozzles or each aperture in the first annular upstream end wall having a respective one of the plurality of main fuel nozzles and each aperture in the second annular upstream end wall having a respective one of the plurality of pilot fuel nozzles. The radially outer annular wall and the radially inner annular wall are axially longer than the radially outer intermediate annular wall and the radially inner intermediate annular wall.

The combustion chamber may comprise a plurality of circumferentially spaced fuel injectors, each fuel injector comprising one of the pilot fuel nozzles and one of the main fuel nozzles.

The annular combustion chamber may comprise an annular upstream end wall, a radially outer annular wall, a radially inner annular wall and a plurality of pilot fuel nozzles and a plurality of main fuel nozzles, the annular upstream end wall having a plurality of circumferentially spaced apertures, the radially outer annular wall or the radially inner annular wall having a plurality of circumferentially spaced apertures, each aperture in the annular upstream end wall having a respective one of the plurality of pilot fuel nozzles, each aperture in the radially outer annular wall or the radially inner annular wall having a respective one of the main fuel nozzles.

The method may include measuring, or determining, the temperature at a downstream end of the annular combustion chamber, switching from the first mode of operation to the second mode of operation when the temperature at the downstream end of the combustion chamber is equal to or greater than a predetermined temperature and switching from the second mode of operation to the first mode of operation when the temperature at a downstream end of the combustion chamber is less than the predetermined temperature. The predetermined temperature may be between and including 1250° C. and 1550° C. The predetermined temperature may be 1500° C.

The method may comprise providing fuel flow valves in the pilot fuel nozzles and fuel flow valves in the main fuel nozzles, the fuel flow valves in the pilot fuel nozzles at, or in, the first circumferential region of the annular combustion chamber being arranged to open at a first predetermined temperature and the pilot fuel nozzles at, or in, the second circumferential region of the annular combustion chamber being arranged to open at a second predetermined temperature and the first predetermined temperature is less than the second predetermined temperature, the fuel flow valves in the main fuel nozzles at, or in, the first circumferential region of the annular combustion chamber being arranged to open at a third predetermined temperature and the main fuel nozzles at, or in, the second circumferential region of the annular combustion chamber being arranged to open at a fourth predetermined temperature and the third predetermined temperature is less than the fourth predetermined temperature. The valves may be solenoid valves.

The combustion chamber may be arranged in a gas turbine engine, comprising a high pressure compressor and a high pressure turbine drivingly connected to the high pressure compressor by a shaft, the high pressure compressor supplying air to the annular combustion chamber, the method may include measuring the speed of rotation of the shaft, switching from the first mode of operation to the second mode of operation when the speed of rotation of the shaft is equal to or greater than a predetermined rotational speed and switching from the second mode of operation to the first mode of operation when the speed of rotation of the shaft is less than the predetermined rotational speed.

The method may comprise providing fuel flow valves in the pilot fuel nozzles and fuel flow valves in the main fuel nozzles, the fuel flow valves in the pilot fuel nozzles at, or in, the first circumferential region of the annular combustion chamber being arranged to open at a first predetermined rotational speed and the pilot fuel nozzles at, or in, the second circumferential region of the annular combustion chamber being arranged to open at a second predetermined rotational speed and the first predetermined rotational speed is less than the second predetermined rotational speed, the fuel flow valves in the main fuel nozzles at, or in, the first circumferential region of the annular combustion chamber being arranged to open at a third predetermined rotational speed and the main fuel nozzles at, or in, the second circumferential region of the annular combustion chamber being arranged to open at a fourth predetermined rotational speed and the third predetermined temperature is less than the fourth predetermined rotational speed. The valves may be solenoid valves.

The combustion chamber may be arranged in a gas turbine engine, comprising a high pressure compressor and a high pressure turbine drivingly connected to the high pressure compressor by a shaft, the high pressure compressor supplying air to the annular combustion chamber, the method may include measuring the power, switching from the first mode of operation to the second mode of operation when the power is equal to or greater than a predetermined power and switching from the second mode of operation to the first mode of operation when the power is less than the predetermined power.

The method may comprise providing fuel flow valves in the pilot fuel nozzles and fuel flow valves in the main fuel nozzles, the fuel flow valves in the pilot fuel nozzles at, or in, the first circumferential region of the annular combustion chamber being arranged to open at a first predetermined power and the pilot fuel nozzles at, or in, the second circumferential region of the annular combustion chamber being arranged to open at a second predetermined power and the first predetermined power is less than the second predetermined power, the fuel flow valves in the main fuel nozzles at, or in, the first circumferential region of the annular combustion chamber being arranged to open at a third predetermined power and the main fuel nozzles at, or in, the second circumferential region of the annular combustion chamber being arranged to open at a fourth predetermined power and the third predetermined power is less than the fourth predetermined power. The valves may be solenoid valves.

Accordingly a second aspect of the present disclosure provides a method of operating a combustion chamber system, the combustion system comprising an annular combustion chamber, a pilot fuel manifold, at least one main fuel manifold, a plurality of circumferentially arranged pilot fuel nozzles and a plurality of circumferentially arranged main fuel nozzles, each pilot fuel nozzle being fluidly connected to the pilot fuel manifold and each main fuel nozzle being fluidly connected to the at least one main fuel manifold, the method comprising supplying a greater total amount of fuel to the pilot fuel nozzles than to the main fuel nozzles and supplying fuel to the pilot fuel nozzles and the main fuel nozzles such that a ratio of the amount of fuel supplied to the pilot fuel nozzle or the pilot fuel nozzles at, or in, a second circumferential region of the annular combustion chamber to the amount of fuel supplied to the main fuel nozzle or the main fuel nozzles at, or in, the second circumferential region of the annular combustion chamber is greater than a ratio of the amount of fuel supplied to the pilot fuel nozzle or the pilot fuel nozzles at, or in, a first circumferential region of the annular combustion chamber to the amount of fuel supplied to the main fuel nozzle or the main fuel nozzles at, or in, the first circumferential region of the annular combustion chamber in the first mode of operation, and supplying a greater total amount of fuel to the main fuel nozzles than to the pilot fuel nozzles and supplying substantially the same amount of fuel to each of the pilot fuel nozzles and supplying substantially the same amount of fuel to each of the main fuel nozzles in a second mode of operation.

Accordingly a third aspect of the present disclosure provides a method of operating a combustion chamber system, the combustion system comprising an annular combustion chamber, a pilot fuel manifold, at least one main fuel manifold, a plurality of circumferentially arranged pilot fuel nozzles and a plurality of circumferentially arranged main fuel nozzles, each pilot fuel nozzle being fluidly connected to the pilot fuel manifold and each main fuel nozzle being fluidly connected to the at least one main fuel manifold, the method comprising supplying a greater total amount of fuel to the pilot fuel nozzles than to the main fuel nozzles and biasing the supply of fuel to the pilot fuel nozzle or the pilot fuel nozzles at, or in, a first circumferential region of the annular combustion chamber than to the pilot fuel nozzle or the pilot fuel nozzles at, or in, a second circumferential region of the annular combustion chamber and biasing the supply of fuel to the main fuel nozzle or the main fuel nozzles at, or in, the first circumferential region of the annular combustion chamber than to the main fuel nozzle or the main fuel nozzles at, or in, the second circumferential of the annular combustion chamber in a first mode of operation, and supplying a greater total amount of fuel to the main fuel nozzles than to the pilot fuel nozzles and supplying substantially the same amount of fuel to each of the pilot fuel nozzles and supplying substantially the same amount of fuel to each of the main fuel nozzles in a second mode of operation.

Accordingly a fourth aspect of the present disclosure provides a combustion chamber system comprising an annular combustion chamber, a pilot fuel manifold, at least one main fuel manifold, a plurality of circumferentially arranged pilot fuel nozzles and a plurality of circumferentially arranged main fuel nozzles, each pilot fuel nozzle being fluidly connected to the pilot fuel manifold and each main fuel nozzle being fluidly connected to the at least one main fuel manifold, a fuel flow restrictor for each pilot fuel nozzle and a fuel flow restrictor for each main fuel nozzle, the fuel flow restrictors for the pilot fuel nozzles at, or in, a first circumferential region of the annular combustion chamber being arranged to open at a first predetermined pressure and the fuel flow restrictors for the pilot fuel nozzles at, or in, a second circumferential region of the annular combustion chamber being arranged to open at a second predetermined pressure and the first predetermined pressure is less than the second predetermined pressure, the fuel flow restrictors for the main fuel nozzles at, or in, the first circumferential region of the annular combustion chamber being arranged to open at a third predetermined pressure and the fuel flow restrictors for the main fuel nozzles at, or in, the second circumferential region of the annular combustion chamber being arranged to open at a fourth predetermined pressure and the third predetermined pressure is less than the fourth predetermined pressure.

The fuel flow restrictors may be valves or the fuel flow restrictors may be orifices.

The fuel flow valves may be check valves with different crack, opening, pressures. The fuel flow valves may be weight distributor valves with different spring tensions to provide different opening pressures. The orifices may have different area/diameters. The orifices may be active variable geometry orifices.

The orifices of the fuel flow restrictors for the pilot fuel nozzles at the first circumferential region may have a different cross-sectional area or different diameter to the orifices of the fuel flow restrictors for the pilot fuel nozzles at the second circumferential region. The orifices of the fuel flow restrictors for the main fuel nozzles at the first circumferential region may have a different cross-sectional area or different diameter to the orifices of the fuel flow restrictors for the main fuel nozzles at the second circumferential region.

The check valves for the pilot fuel nozzles at the first circumferential region may have a different opening pressure to the check valves for the pilot fuel nozzles at the second circumferential region. The check valves for the main fuel nozzles at the first circumferential region may have a different opening pressure to the check valves for the main fuel nozzles at the second circumferential region.

The weight distributor valves for the pilot fuel nozzles at the first circumferential region may have a different spring tension to the weight distributor valves for the pilot fuel nozzles at the second circumferential region. The weight distributor valves for the main fuel nozzles at the first circumferential region may have a different spring tension to the weight distributor valves for the main fuel nozzles at the second circumferential region.

The axis of the annular combustion chamber may be arranged substantially horizontally.

The annular combustion chamber comprising an annular upstream end wall, a radially outer annular wall, a radially inner annular wall and a plurality of fuel injectors, the annular upstream end wall having a plurality of circumferentially spaced apertures, each aperture in the upstream end wall having a respective one of the plurality of fuel injectors, each fuel injector comprising one of the pilot fuel nozzles and one of the main fuel nozzles.

The combustion chamber may comprise a plurality of circumferentially spaced fuel injectors, each fuel injector comprising one of the pilot fuel nozzles and one of the main fuel nozzles.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
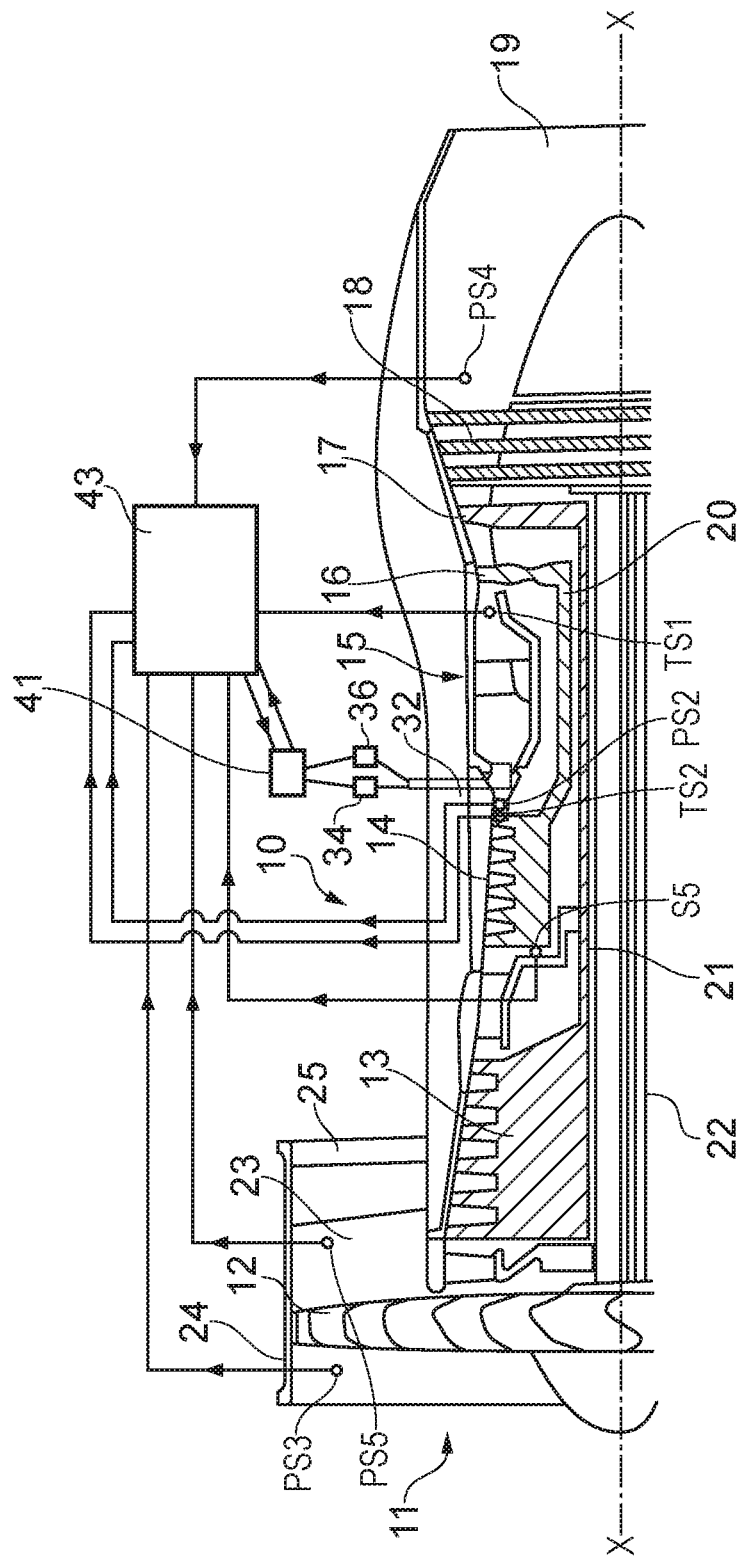
FIG. 1 is a sectional side view of a turbofan gas turbine engine.

With reference to FIG. 1, a turbofan gas turbine engine is generally indicated at 10, having a principal and rotational axis X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and an exhaust nozzle 19. A nacelle 24 generally surrounds the engine 10 and defines the intake 11, a bypass duct 23 and a bypass exhaust nozzle 25.

The gas turbine engine 10 works in the conventional manner so that air entering the intake 11 is compressed by the fan 12 to produce two air flows: a first air flow A into the intermediate pressure compressor 13 and a second air flow B which passes through a bypass duct 23 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high 16, intermediate 17 and low 18 pressure turbines drive respectively the high pressure compressor 14, intermediate pressure compressor 13 and fan 12, each by suitable interconnecting shaft 20, 21 and 22 respectively.

Figure 2:
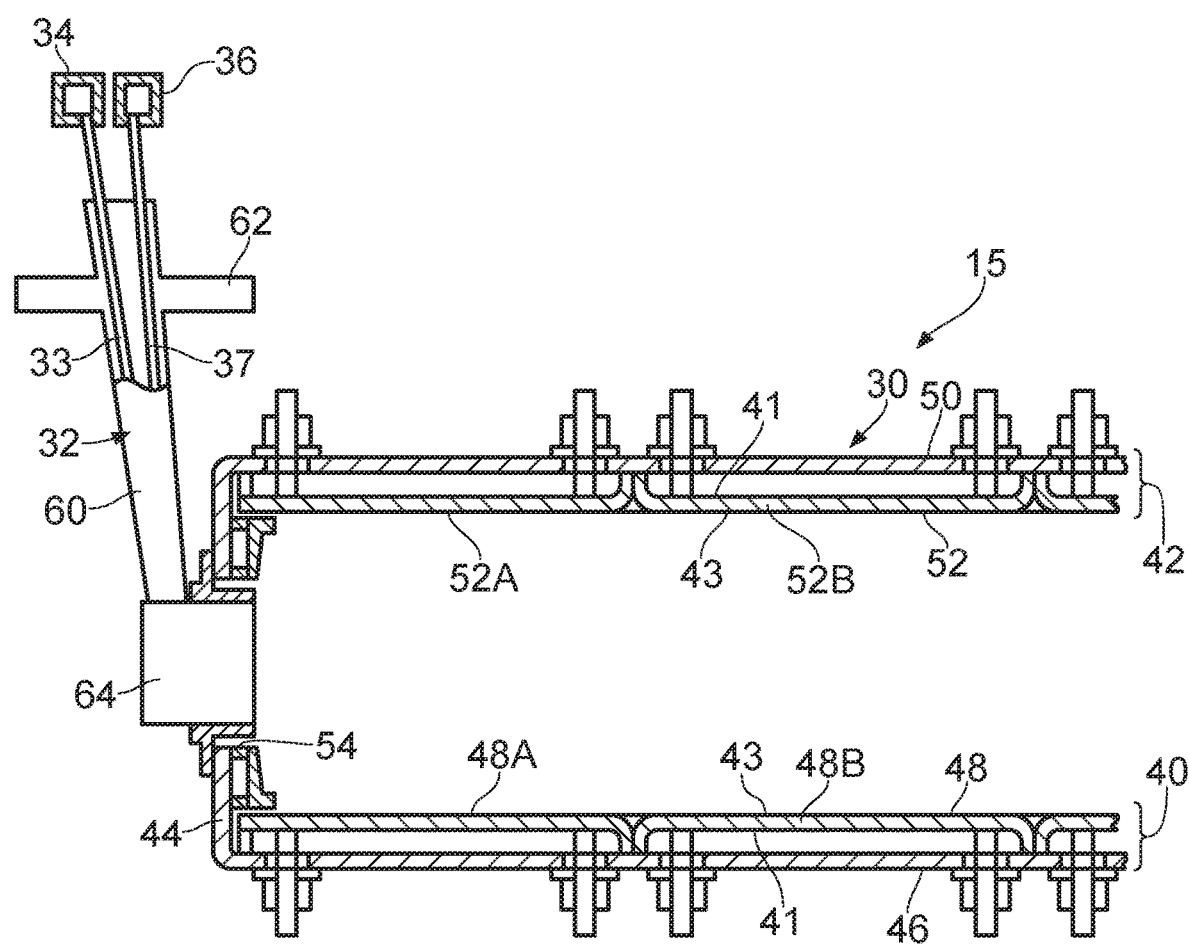
FIG. 2 is an enlarged schematic cross-sectional view of the combustion chamber assembly shown in FIG. 1.

The combustion equipment 15 is shown more clearly in FIG. 2 and the combustion equipment 15 comprises an annular combustion chamber 30, a plurality of fuel injectors 32, a pilot fuel manifold 34, a main fuel manifold 36 and a fuel splitter valve or fuel splitter unit 41. The annular combustion chamber 30 comprises a radially inner annular wall 40, a radially outer annular wall structure 42 and an annular upstream end wall 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44. The second annular wall 48 comprises a plurality of rows of combustion chamber tiles 48A and 48B and the fourth annular wall 52 comprises a plurality of rows of combustion chamber tiles 52A and 52B. The combustion chamber tiles 48A and 48B are secured onto the first annular wall 46 by threaded studs, washers and nuts and the combustion chamber tiles 52A and 52B are secured onto the third annular wall 50 by threaded studs, washers and nuts.

Figure 3:
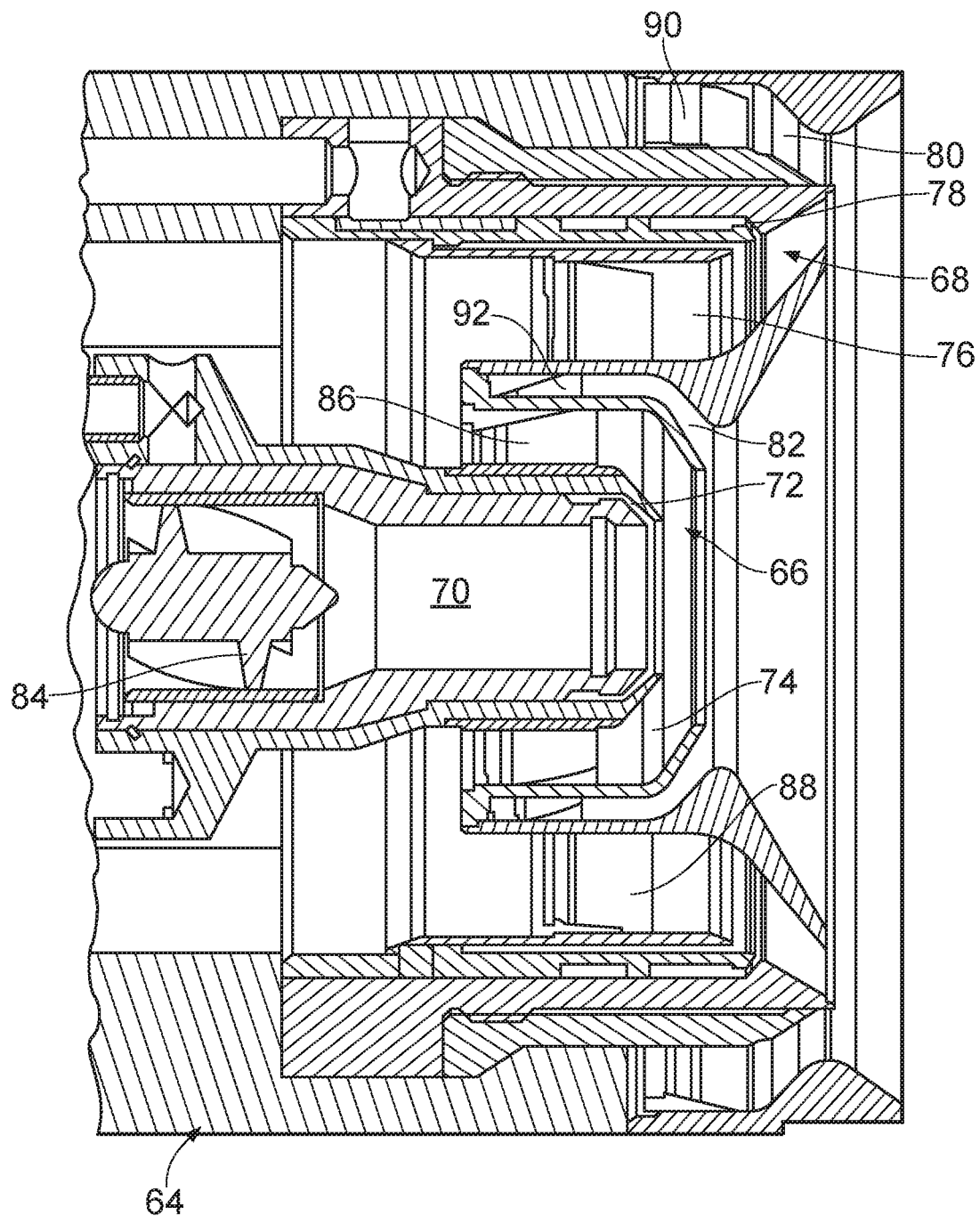
FIG. 3 is an enlarged schematic cross-sectional view of a fuel injector shown in FIG. 2.
Figure 4:
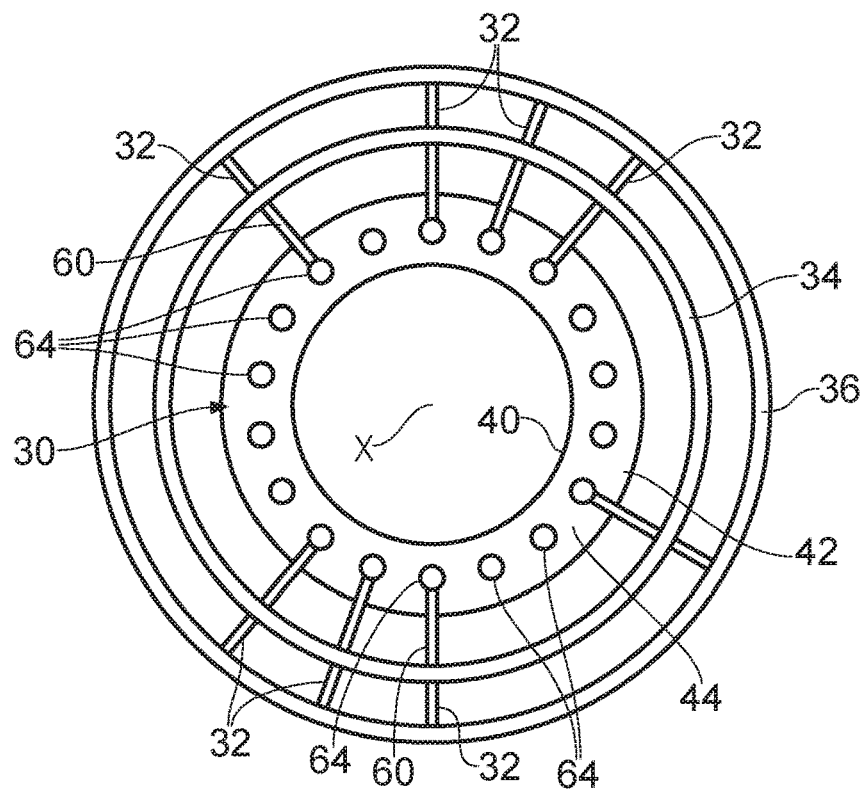
FIG. 4 is a schematic view of one arrangement of the pilot and main fuel manifolds shown in FIG. 2.

The upstream end wall structure 44 has a plurality of circumferentially spaced apertures 54 and each aperture 54 has a respective one of the plurality of fuel injectors 32 located therein. The fuel injectors 32 are arranged to supply fuel into the annular combustion chamber 15 during operation of the gas turbine engine 10. Each fuel injector 32 is a lean burn fuel injector and each fuel injectors 32 comprises a fuel feed arm 60, a flange 62 and a fuel injector head 64. The fuel injector head 64 of each fuel injector 32 comprises a pilot fuel nozzle 66 and a main fuel nozzle 68, as shown in FIG. 3. The pilot fuel nozzle 66 of each fuel injector 32 is fluidly connected to the pilot fuel manifold 34 by a fuel passage 33 extending through the fuel feed arm 60 and the main fuel nozzle 68 of each fuel injector 32 is fluidly connected to the main fuel manifold 36 by a fuel passage 37 extending through the fuel feed arm 60, as shown in FIG. 4.

A fuel injector head 64 of a lean burn fuel injector 32 is shown more clearly in FIG. 3. The fuel injector head 64 has a coaxial arrangement of an inner pilot airblast fuel injector 66 and an outer mains airblast fuel injector 68. The pilot airblast fuel injector 66 comprises, in order from radially inner to outer, a coaxial arrangement of a pilot inner air swirler passage 70, an annular pilot fuel passage 72 and an annular pilot outer air swirler passage 74. The mains airblast fuel injector 68 comprises, in order from radially inner to outer, a coaxial arrangement of an annular mains inner air swirler passage 76, an annular mains fuel passage 78 and an annular mains outer air swirler passage 80. An intermediate annular air swirler passage 82 is sandwiched between the annular pilot outer air swirler passage 74 of the pilot airblast fuel injector 66 and the annular mains inner air swirler passage 76 of the mains airblast fuel injector 68. Each air swirler passage 70, 74, 76, 80 and 82 has a respective air swirler 84, 86, 88, 90 and 92 which swirls the air flow through that passage. Each air swirler 84, 86, 88, 90 and 92 comprises a plurality of swirl vanes. The fuel from the annular pilot fuel passage 72 of the inner pilot airblast fuel injector 66 flows onto a downstream pre-filming surface to be atomised by the air flows from the pilot inner air swirler passage 70 and the annular pilot outer air swirler passage 74. The fuel from the annular mains fuel passage 78 of the outer mains airblast fuel injector 68 flows onto a downstream conical pre-filming surface to be atomised by the air flows from the annular mains inner air swirler passage 76 and the annular mains outer air swirler passage 80.

The fuel splitter valve, or fuel splitter unit, 43 controls the supply of fuel to the pilot fuel manifold 34 and the main fuel manifold 36, e.g. it supplies the appropriate amounts of fuel to the pilot fuel manifold 34 and the main fuel manifold 36 in a selected ratio, discussed more fully below.

The method of operating the combustion chamber system comprises supplying a greater total amount of fuel to the pilot fuel nozzles 66 than to the main fuel nozzles 64 and supplying a greater amount of fuel to the pilot fuel nozzle 66 or the pilot fuel nozzles 66 at, or in, a first circumferential region of the annular combustion chamber 30 than to the pilot fuel nozzle 66 or the pilot fuel nozzles 66 at, or in, a second circumferential region of the annular combustion chamber 30 and supplying a greater amount of fuel to the main fuel nozzle 68 or the main fuel nozzles 68 at, or in, the first circumferential region of the annular combustion chamber 30 than to the main fuel nozzle 68 or the main fuel nozzles 8 at, or in, the second circumferential of the annular combustion chamber 30 in a first mode of operation. In this particular example, the method comprises supplying a greater amount of fuel to the pilot fuel nozzle 66 or the pilot fuel nozzles 66 at, or in, a bottom circumferential region of the annular combustion chamber 30 than to the pilot fuel nozzle 6 or the pilot fuel nozzles 66 at, or in, a top circumferential region of the annular combustion chamber 30 and supplying a greater amount of fuel to the main fuel nozzle 68 or the main fuel nozzles 68 at, or in, the bottom circumferential region of the annular combustion chamber 30 than to the main fuel nozzle 68 or main fuel nozzles 68 at, or in, the top circumferential region of the annular combustion chamber 30 in the first mode of operation. The method of operating the combustion chamber system also comprises supplying a greater total amount of fuel to the main fuel nozzles 68 than to the pilot fuel nozzles 66 and supplying substantially the same amount of fuel to each of the pilot fuel nozzles 66 and supplying substantially the same amount of fuel to each of the main fuel nozzles 68 in a second mode of operation. The method also comprises supplying progressively smaller amounts of fuel to the pilot fuel nozzles 66 between the pilot fuel nozzle 66 or the pilot fuel nozzles 66 at, or in, the bottom circumferential region of the annular combustion chamber 30 and the pilot fuel nozzle 66 or the pilot fuel nozzles 66 at, or in, the top circumferential region of the annular combustion chamber 30 and supplying progressively smaller amounts of fuel to the main fuel nozzles 68 between the main fuel nozzle 68 or the main fuel nozzles 68 at, or in, the bottom circumferential region of the annular combustion 30 and the main fuel nozzle 68 or main fuel nozzles 68 at, or in, the top circumferential region of the annular combustion chamber 30 in the first mode of operation.

Figure 5:
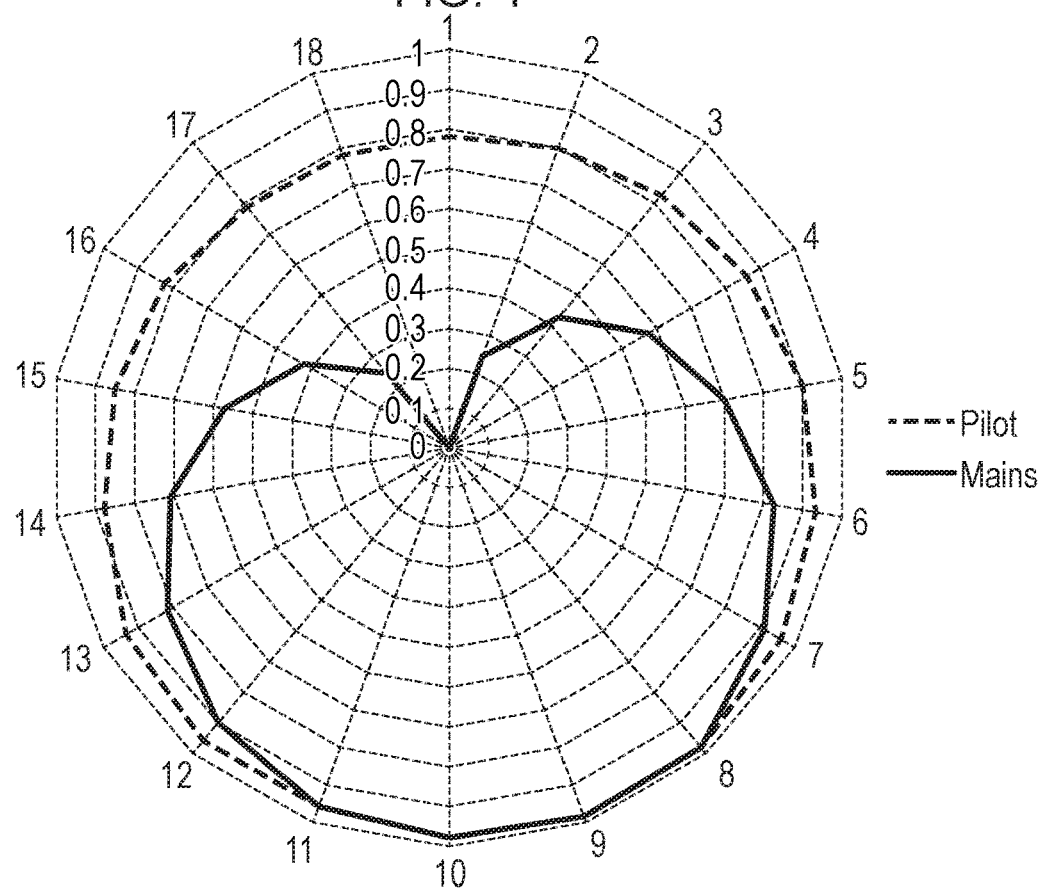
FIG. 5 is a plot showing the pilot fuel distribution to the pilot fuel nozzles and the main fuel distribution to the main fuel nozzles in the arrangement shown in FIG. 4.

FIG. 5 provides an example of the pilot fuel distribution to the pilot fuel nozzles 66 and the main fuel distribution to the main fuel nozzles 68 in the first mode of operation. In this example 80% of the fuel is supplied to the pilot fuel manifold 34 and 20% of the fuel is supplied to the main fuel manifold 36 in the first mode of operation. In this example there are eighteen fuel injectors 32 equally spaced circumferentially around the annular combustion chamber 30 and hence each fuel injector 32 is separated from its immediately circumferentially adjacent fuel injectors 32 by an angle of 20°. FIG. 5 shows that a first fuel injector 32 is arranged at the top of the annular combustion chamber 30 and a tenth fuel injector 32 is arranged at the bottom of the annular combustion chamber 30. The pilot fuel nozzle 66 of the tenth fuel injector 32 receives the most amount of fuel and the pilot fuel nozzle 66 of the first fuel injector 32 receives the least amount of fuel and the pilot fuel nozzles 66 between the first and the tenth fuel injector 32 receive progressively more fuel. The pilot fuel nozzle 66 of the first fuel injector 32 receives about 80% of the fuel that the pilot fuel nozzle 66 of the tenth fuel injector 32 receives. The pilot fuel nozzle 66 of the fifth fuel injector 32 receives about 90% of the fuel that the pilot fuel nozzle 66 of the tenth fuel injector 32 receives and the pilot fuel nozzle 66 of the thirteenth fuel injector 32 receives about 95% of the fuel that the pilot fuel nozzle 66 of the tenth fuel injector 32 receives.

The main fuel nozzle 68 of the tenth fuel injector 32 receives the most amount of fuel and the main fuel nozzle 68 of the first fuel injector 32 receives the least amount of fuel and the main fuel nozzles 68 between the first and the tenth fuel injector 32 receive progressively more fuel. The main fuel nozzle 68 of the first fuel injector 32 receives 0% of the fuel that the main fuel nozzle 68 of the tenth fuel injector 32 receives. The main fuel nozzle 68 of the fifth fuel injector 32 receives about 70% of the fuel that the main fuel nozzle 68 of the tenth fuel injector 32 receives and the main fuel nozzle 68 of the thirteenth fuel injector 32 receives about 80% of the fuel that the main fuel nozzle 66 of the tenth fuel injector 32 receives. In this example in the second mode of operation 20% of the fuel is supplied to the pilot fuel nozzles 66 and 80% of the fuel is supplied to the main fuel nozzles 68.

Thus, it is seen that because the pilot fuel manifold 34 is supplied more fuel than the main fuel manifold 36 that the ratio of the amount of fuel supplied to the pilot fuel nozzle 66 or the pilot fuel nozzles 66 at, or in, the second circumferential region of the annular combustion chamber 30 to the amount of fuel supplied to the pilot fuel nozzle 66 or the pilot fuel nozzles 66 at, or in, the first circumferential region of the annular combustion chamber 30 is greater than the ratio of the amount of fuel supplied to the main fuel nozzle 68 or the main fuel nozzles 68 at, or in, the second circumferential region of the annular combustion chamber 30 to the amount of fuel supplied to the main fuel nozzle 68 or the main fuel nozzles 68 at, or in, the first circumferential of the annular combustion chamber 30 in the first mode of operation. In particular, the ratio of the amount of fuel supplied to the pilot fuel nozzle 66 or the pilot fuel nozzles 66 at, or in, the top region of the annular combustion chamber 30 to the amount of fuel supplied to the pilot fuel nozzle 66 or the pilot fuel nozzles 66 at, or in, the bottom region of the annular combustion chamber 30 is greater than the ratio of the amount of fuel supplied to the main fuel nozzle 68 or the main fuel nozzles 68 at, or in, the top region of the annular combustion chamber 30 to the amount of fuel supplied to the main fuel nozzle 68 or the main fuel nozzles 68 at, or in, the bottom region of the annular combustion chamber 30 in the first mode of operation. Also it is to be noted that although 80% of the fuel is supplied to the pilot fuel manifold 34 and 20% of the fuel is supplied to the main fuel manifold 36, e.g. an 80/20 ratio, the ratio of the fuel supplied to the pilot fuel nozzles 66 at the bottom region of the annular combustion chamber 30 to the fuel supplied to the main fuel nozzles 68 at the bottom region of the annular combustion chamber 30 will be less than 80/20 and conversely the ratio will be greater than 80/20 at the top region of the annular combustion chamber 30.

The method includes determining, or measuring, the temperature (T40) at a downstream end, an exit, of the annular combustion chamber 30. The temperature (T40) at the downstream end of the annular combustion chamber may be measured using one or more temperature sensors, e.g. thermocouples, optical pyrometers, TS1 as shown in FIG. 1. The temperature measurement from the sensor TS1 is provided to a control unit 43 via suitable electrical connections. The control unit 43 uses the appropriate temperature measurements to control the fuel splitter valve 41. The temperature (T40) at the downstream end of the annular combustion chamber 30 may be determined, inferred, by measuring the temperature (T30) and the pressure (P30) at the downstream end of high pressure compressor 14 using one or more temperature sensors, e.g. thermocouples TS2, and pressure sensors PS2, as shown in FIG. 1 and by measuring the fuel flow to the combustion chamber 30. The temperature and pressure measurements from the sensors TS2 and PS2 and a measurement of fuel flow from the splitter valve 41 are provided to the control unit 43 via suitable electrical connections. The control unit 43 uses the appropriate temperature, pressure and fuel flow measurements to control the fuel splitter valve 41. The temperature at the downstream end of the combustion chamber 30 is determined from the formula T40=f (T30, P30, Fuel flow).

The combustion system switches from the first mode of operation to the second mode of operation when the temperature at the downstream end of the annular combustion chamber 30 is equal to or greater than a predetermined temperature and switching from the second mode of operation to the first mode of operation when the temperature at the downstream end of the annular combustion chamber 30 is less than the predetermined temperature. The predetermined temperature may for example be in the range 1250° C. to 1550° C., e.g. 1500° C. Temperatures below 1500° C. correspond to low power conditions of the gas turbine engine 10 when the gas turbine engine 10 is operating at idle conditions, hold, approach and descent.

Figure 6:
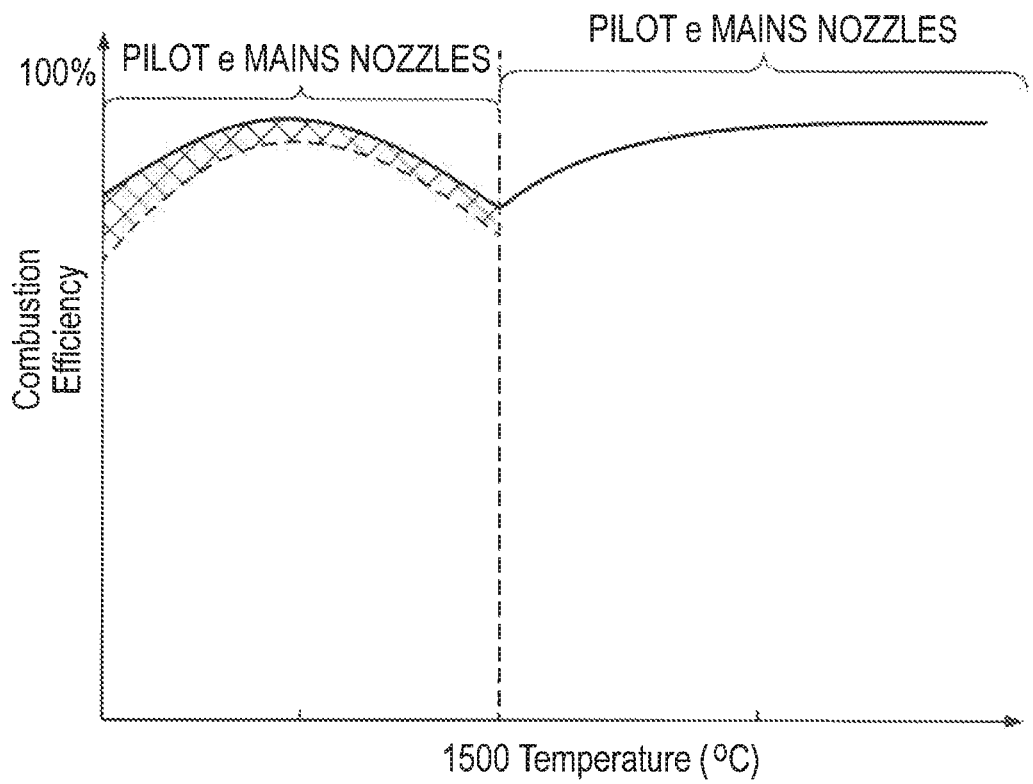
FIG. 6 is a schematic graph showing combustion efficiency versus temperature for a method of operating a combustion system according to the present disclosure.

FIG. 6 shows a graph of combustion efficiency versus temperature for a method of operating a combustion system according to the present disclosure. This figure shows the first mode of operation on the left hand side and the second mode of operation on the right hand side. In the first mode of operation the annular combustion chamber 30 is operating at low temperatures below a predetermined temperature at the exit of the annular combustion chamber 30. In the second mode of operation the annular combustion chamber 30 is operating at higher temperatures at or above the predetermined temperature at the exit of the annular combustion chamber 30. In this example the predetermined temperature is 1500° C. FIG. 6 shows that the pilot and main fuel nozzles are operating in the second mode of operation and also in the first mode of operation.

Figure 7:
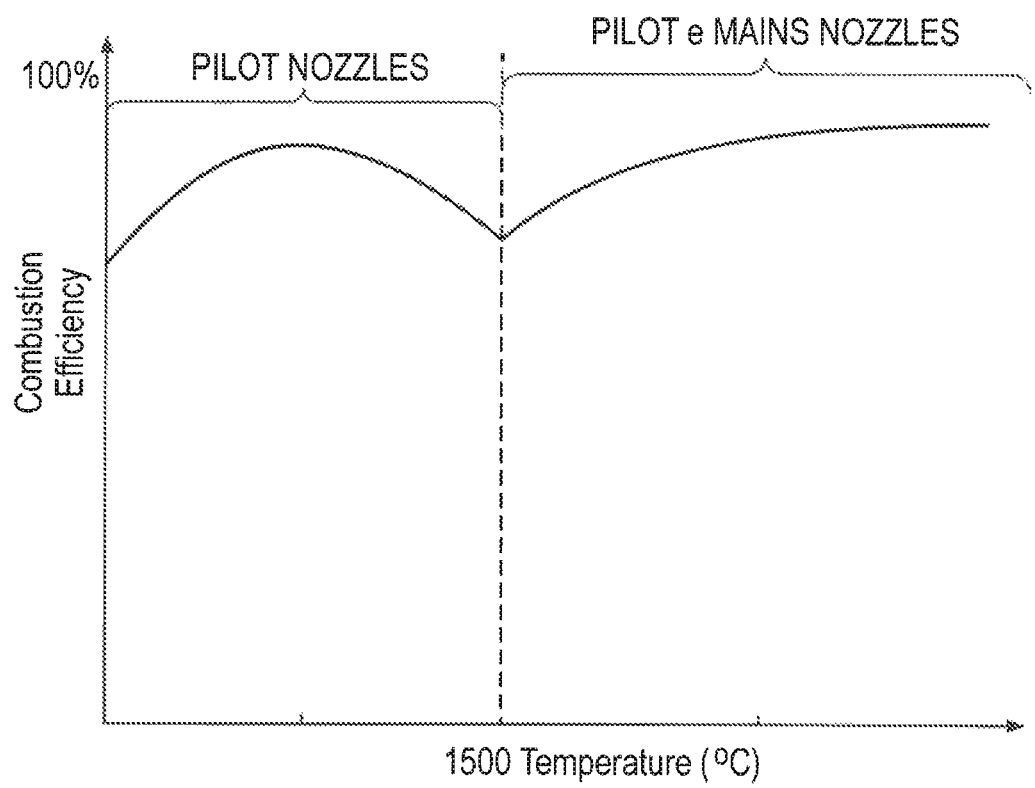
FIG. 7 is a schematic graph showing combustion efficiency versus temperature for a prior art method of operating a combustion system.

FIG. 7 shows a corresponding graph of combustion efficiency versus temperature for a prior art method of operating a combustion system. FIG. 7 shows that the pilot and main fuel nozzles are operating in the second mode of operation but only the pilot fuel nozzles are operating in the first mode of operation as discussed previously.

Comparison of FIGS. 6 and 7 shows that there is a cross-hatched area in FIG. 6 in the first mode of operation where the combustion efficiency of the annular combustion chamber 30 is increased compared to the first mode of operation of the prior art method of operation.

Thus, in the first mode of operation the pilot fuel nozzles 66 and the main fuel nozzles 68 at the top circumferential region of the annular combustion chamber 30 produce a local air fuel ratio (AFR) of 60 to 100 and the pilot fuel nozzles 66 and the main fuel nozzles 68 at the bottom circumferential region of the annular combustion chamber 30 produce a local air fuel ratio (AFR) of 30 to 40. Thus, the local air fuel ratio (AFR) varies circumferentially around the annular combustion chamber 30.

In the arrangement in FIG. 2 the uneven, or biased, distribution of fuel from the pilot fuel manifold 34 to the pilot fuel nozzles 66 and the uneven, or biased, distribution of fuel from the main fuel manifold 36 to the main fuel nozzles 68 is simply provided due to gravity and the fuel passages within each fuel injector 32 to the pilot fuel nozzle 66 and the main fuel nozzle 68 are valve-less and/or restrictor-less to enable the uneven, biased, fuel distributions. Thus, the axis X of the annular combustion chamber 30 is arranged substantially horizontally during the first mode of operation, idle, hold, approach and descent.

The total amount of fuel supplied to the pilot fuel nozzles 66 and the main fuel nozzles 68 increases as the power of the gas turbine engine 10 is increased in both the first and the second modes of operation while retaining the same proportion of the total amount of fuel to the pilot fuel manifold 34 and the main fuel manifold 36 in the first and second modes of operation, e.g. 80% to the pilot fuel manifold 34 and 20% to the main fuel manifold 36 in the first mode of operation and 20% to the pilot fuel manifold 34 and 80% to the main fuel manifold 36 in the second mode of operation.

Figure 8:
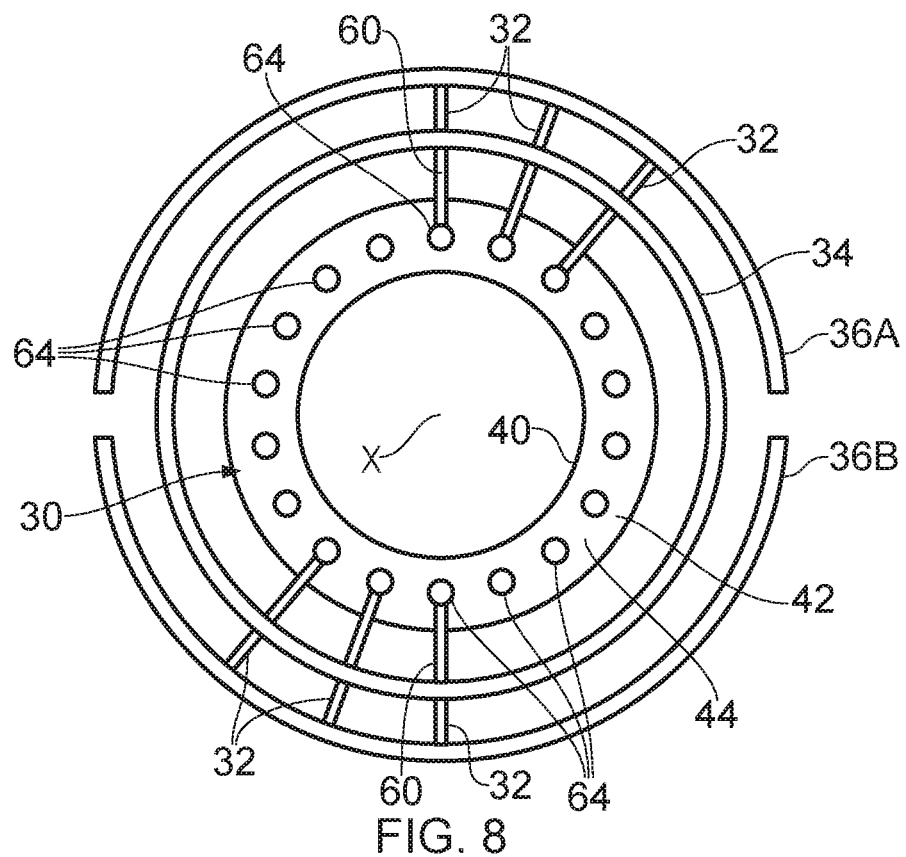
FIG. 8 is a schematic view of an alternative arrangement of the pilot and main fuel manifolds shown in FIG. 2.

FIG. 8 shows another combustion chamber system arrangement comprising a pilot fuel manifold 34, a first main fuel manifold 36A and a second main fuel manifold 36B. The pilot fuel nozzle 66 of each fuel injector 32 is fluidly connected to the pilot fuel manifold 34. A plurality of the main fuel nozzles 68 are fluidly connected to the first main fuel manifold 36A and a plurality of the main fuel nozzles 68 are fluidly connected to the second main fuel manifold 36B. In particular the main fuel nozzle 68 of half of the fuel injectors 32 are fluidly connected to the first main fuel manifold 36A and the main fuel nozzle 68 of half of the fuel injectors 32 are fluidly connected to the second main fuel manifold 36B. The first main fuel manifold 36A is arranged around an upper half of the annular combustion chamber 30 and the second main fuel manifold 36B is arranged around a lower half of the annular combustion chamber 30.

The method of operation comprises supplying a greater amount of fuel to the pilot fuel nozzle 66 or the pilot fuel nozzles 66 at, or in, the bottom region of the annular combustion chamber 30 than to the pilot fuel nozzle 66 or the pilot fuel nozzles 66 at, or in, the top region of the annular combustion chamber 30 and supplying a greater amount of fuel from the second main fuel manifold 36B to the associated main fuel nozzle 68 or the associated main fuel nozzles 68 at, or in, the bottom region of the annular combustion chamber 30 than to the associated main fuel nozzle 68 or the associated main fuel nozzles 68 nearer to the top region of the annular combustion chamber 30 and supplying no fuel from the first main fuel manifold 36A to the associated main fuel nozzles 68 in the first mode of operation.

The main fuel nozzle 68 of the tenth fuel injector 32 receives the most amount of fuel and the main fuel nozzles 68 of the sixth and the fourteenth fuel injectors 32 receive the least amount of fuel and the main fuel nozzles 68 between the sixth and the tenth fuel injectors 32 and between the fourteenth and tenth fuel injectors 32 receive progressively more fuel.

In an example the method comprises supplying 80% of the fuel to the pilot fuel nozzles 66 and supplying 20% of the fuel to the main fuel nozzles 68 associated with the second main fuel manifold 36B in the first mode of operation and comprises supplying 20% of the fuel to the pilot fuel nozzles 66 and supplying 80% of the fuel to the main fuel nozzles 68 in the second mode of operation.

Figure 9:
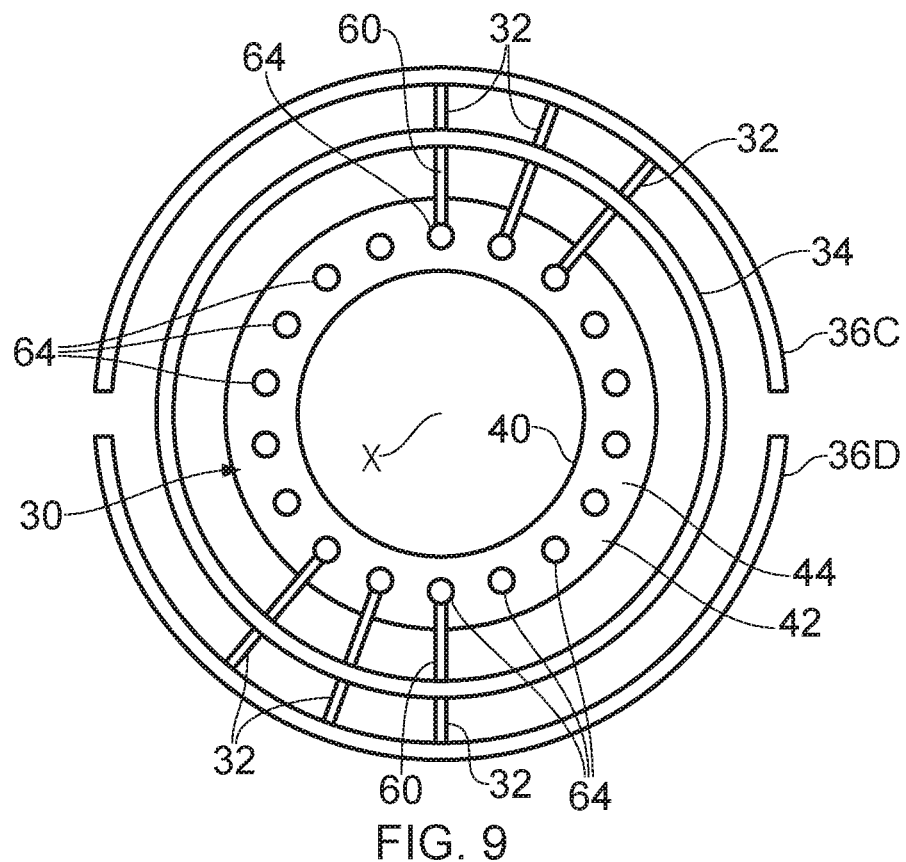
FIG. 9 is a schematic view of another arrangement of the pilot and main fuel manifolds shown in FIG. 2.

FIG. 9 shows another combustion chamber system arrangement, which is similar to that shown in FIG. 8, comprising a pilot fuel manifold 34, a first main fuel manifold 36C and a second main fuel manifold 36D.

The method of operation comprises supplying a greater amount of fuel to the pilot fuel nozzle 66 or the pilot fuel nozzles 66 at, or in, the bottom region of the annular combustion chamber 30 than to the pilot fuel nozzle 66 or the pilot fuel nozzles 66 at, or in, the top region of the annular combustion chamber 30 and supplying a greater amount of fuel from the first main fuel manifold 36C to the associated main fuel nozzle 68 or the associated main fuel nozzles 68 nearer to the bottom region of the annular combustion chamber 30 than to the associated main fuel nozzle 68 or the associated main fuel nozzles 68 at the top region of the annular combustion chamber 30 and supplying no fuel from the second main fuel manifold 36D to the associated main fuel nozzles 68 in the first mode of operation.

The main fuel nozzles 68 of the fifth and fifteenth fuel injectors 32 receive the most amount of fuel and the main fuel nozzle 68 of the first fuel injector 32 receive the least amount of fuel and the main fuel nozzles 68 between the first and the fifth fuel injectors 32 and between the first and fifteenth fuel injectors 32 receive progressively more fuel.

In an example the method comprises supplying 80% of the fuel to the pilot fuel nozzles 66 and supplying 20% of the fuel to the main fuel nozzles 68 associated with the first main fuel manifold 36C in the first mode of operation and comprises supplying 20% of the fuel to the pilot fuel nozzles 66 and supplying 80% of the fuel to the main fuel nozzles 68 in the second mode of operation.

Figures 10, 11:
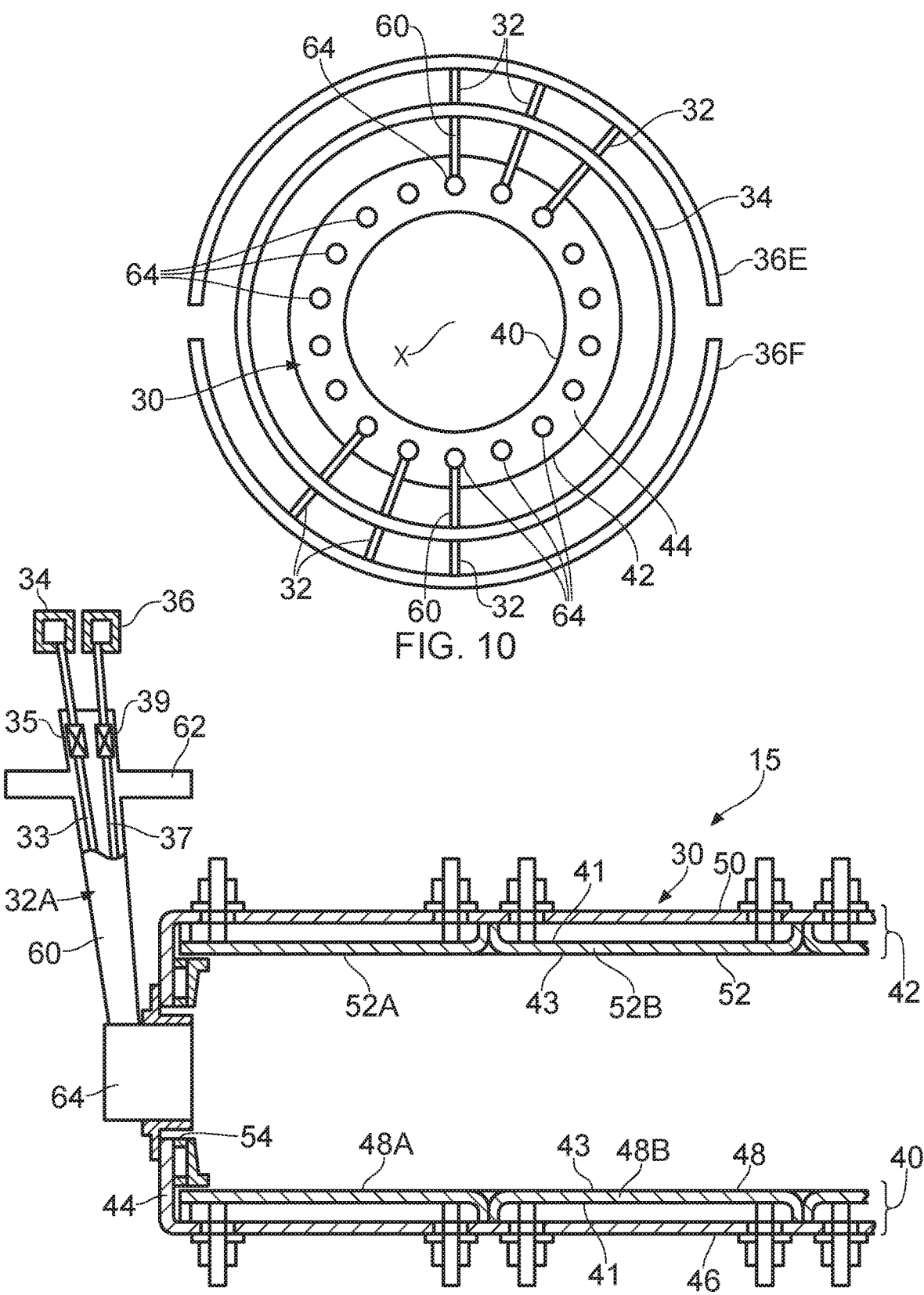
FIG. 10 is a schematic view of a further arrangement of the pilot and main fuel manifolds shown in FIG. 2.
FIG. 11 is an alternative enlarged schematic cross-sectional view of the combustion chamber assembly shown in FIG. 1.

FIG. 10 shows another combustion chamber system arrangement, similar to that shown in FIG. 8, comprising a pilot fuel manifold 34, a first main fuel manifold 36E and a second main fuel manifold 36F.

The method of operation comprises supplying a greater amount of fuel to the pilot fuel nozzle 66 or the pilot fuel nozzles 66 at, or in, the bottom region of the annular combustion chamber 30 than to the pilot fuel nozzle 66 or the pilot fuel nozzles 66 at, or in, the top region of the annular combustion chamber 30 and supplying a greater amount of fuel from the second main fuel manifold 36F to the associated main fuel nozzle 68 or the associated main fuel nozzles 68 at, or in, the bottom region of the annular combustion chamber 30 than to the associated main fuel nozzle 68 or associated main fuel nozzles 68 nearer to the top region of the annular combustion chamber 30 and supplying a greater amount of fuel from the first main fuel manifold 36E to the associated main fuel nozzle 68 or the associated main fuel nozzles 68 nearer to the bottom region of the annular combustion chamber 30 than to the associated main fuel nozzle 68 or the associated main fuel nozzles 68 at the top region of the annular combustion chamber 30 in a first mode of operation.

The main fuel nozzle 68 of the tenth fuel injector 32 receives the most amount of fuel from the main fuel manifold 36F and the main fuel nozzles 68 of the sixth and the fourteenth fuel injectors 32 receive the least amount of fuel from the main fuel manifold 36F and the main fuel nozzles 68 between the sixth and the tenth fuel injectors 32 and between the fourteenth and tenth fuel injectors 32 receive progressively more fuel.

The main fuel nozzles 68 of the fifth and fifteenth fuel injectors 32 receive the most amount of fuel from the main fuel manifold 36E and the main fuel nozzle 68 of the first fuel injector 32 receive the least amount of fuel from the main fuel manifold 36E and the main fuel nozzles 68 between the first and the fifth fuel injectors 32 and between the first and fifteenth fuel injectors 32 receive progressively more fuel.

In an example the method comprises supplying 80% of the fuel to the pilot fuel nozzles 66, supplying 10% of the fuel from the first main fuel manifold 36E to the associated main fuel nozzles 68 and supplying 10% of the fuel from the second main fuel manifold 36F to the associated main fuel nozzles 68 in the first mode of operation and comprises supplying 20% of the fuel to the pilot fuel nozzles 66 and 80% of the fuel to the main fuel nozzles 68 in the second mode of operation.

Thus, the pilot fuel nozzle or the pilot fuel nozzles at the top region of the respective pilot fuel manifold receive the least amount of fuel and the pilot fuel nozzle or the pilot fuel nozzles at the bottom region of the respective pilot fuel manifold receive the greatest amount of fuel during the first mode of operation. Similarly, the main fuel nozzle or the main fuel nozzles at the top region of the respective main fuel manifold receive the least amount of fuel and the main fuel nozzle or the main fuel nozzles at the bottom region of the respective main fuel manifold receive the greatest amount of fuel.

FIG. 11 shows alternative combustion equipment 15 which is substantially the same as that shown in FIG. 2 and like parts are denoted by like numerals. FIG. 11 differs in that each fuel injector 32A has a valve, or a restrictor, 35 in the fuel passage 33 to the pilot fuel nozzle 66 and a valve, or a restrictor, 39 in the fuel passage 37 to the main fuel nozzle 68.

Figure 12:
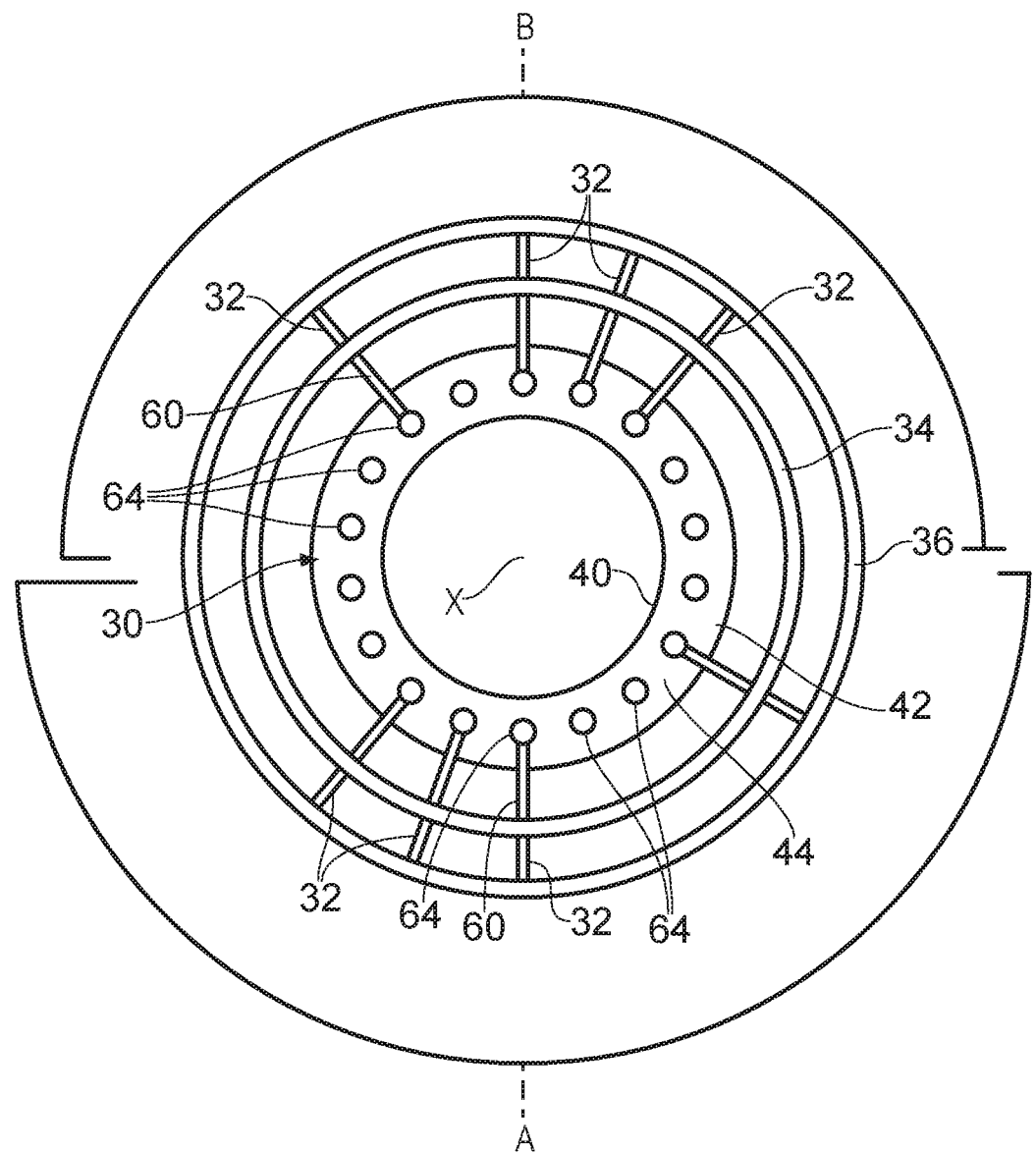
FIG. 12 is a schematic view of one arrangement of the pilot and main fuel manifolds shown in FIG. 11.

FIG. 12 shows an arrangement of the fuel flow valves, or restrictors, 35 for the pilot fuel nozzles 66 at, or in, the first circumferential region A of the annular combustion chamber 30 are arranged to open at a first predetermined pressure and the fuel flow valves, or restrictors, 35 for the pilot fuel nozzles 66 at, or in, the second circumferential region B of the annular combustion chamber 30 are arranged to open at a second predetermined pressure and the first predetermined pressure is less than the second predetermined pressure. Additionally, the fuel flow valves, or restrictors, 39 for the main fuel nozzles 68 at, or in, the first circumferential region A of the annular combustion chamber 30 arranged to open at a third predetermined pressure and the fuel flow valves, or restrictors, 39 for the main fuel nozzles 68 at, or in, the second circumferential region B of the annular combustion chamber 30 are arranged to open at a fourth predetermined pressure and the third predetermined pressure is less than the fourth predetermined pressure.

In particular, the fuel flow valves, or restrictors, 35 for the pilot fuel nozzles 66 at, or in, the bottom region A of the annular combustion chamber 30 are arranged to open at the first predetermined pressure and the fuel flow valves, or restrictors, 35 for the pilot fuel nozzles 66 at, or in, the top region B of the annular combustion chamber 30 are arranged to open at a second predetermined pressure and the first predetermined pressure is less than the second predetermined pressure, the fuel flow valves, or restrictors, 39 for the main fuel nozzles 68 at, or in, the bottom region A of the annular combustion chamber 30 are arranged to open at a third predetermined pressure and the fuel flow valves, or restrictors, 39 for the main fuel nozzles 68 at, or in, the top region B of the annular combustion chamber 30 are arranged to open at a fourth predetermined pressure and the third predetermined pressure is less than the fourth predetermined pressure.

Figure 13:
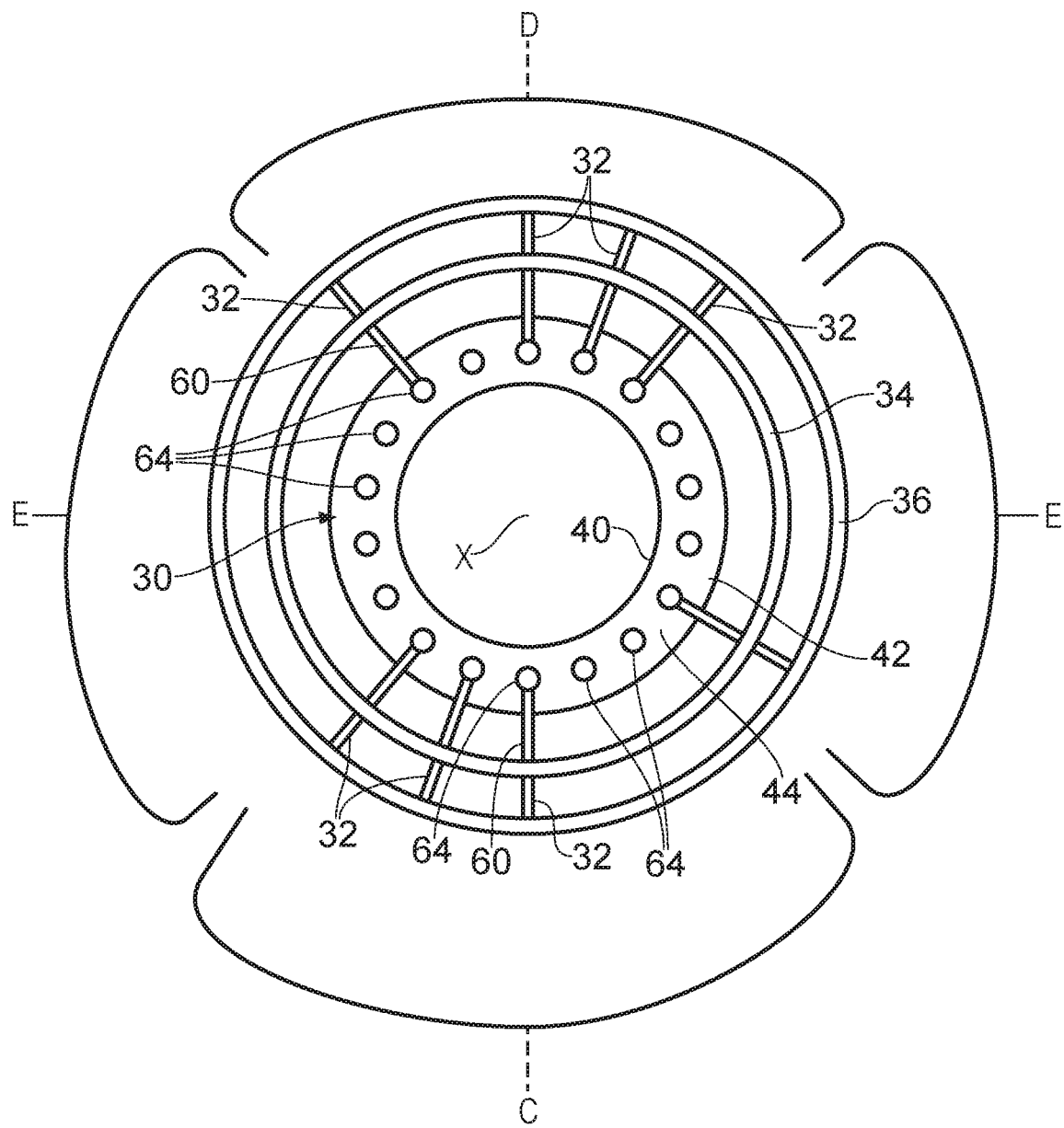
FIG. 13 is a schematic view of another arrangement of the pilot and main fuel manifolds shown in FIG. 11.

FIG. 13 shows another arrangement in which the fuel flow valves, or restrictors, 35 for the pilot fuel nozzles 66 at, or in, the bottom region C of the annular combustion chamber 30 are arranged to open at the first predetermined pressure and the fuel flow valves, or restrictors, 35 for the pilot fuel nozzles 66 at, or in, the top region D of the annular combustion chamber 30 are arranged to open at a second predetermined pressure and the first predetermined pressure is less than the second predetermined pressure, the fuel flow valves, or restrictors, 39 for the main fuel nozzles 68 at, or in, the bottom region C of the annular combustion chamber 30 are arranged to open at a third predetermined pressure and the fuel flow valves, or restrictors, 39 for the main fuel nozzles 68 at, or in, the top region D of the annular combustion chamber 30 are arranged to open at a fourth predetermined pressure and the third predetermined pressure is less than the fourth predetermined pressure. In addition the fuel flow valves, or restrictors, 35 for the pilot fuel nozzles 66 in an intermediate region E between the bottom region C of the annular combustion chamber 30 and the top region D of the annular combustion chamber 30 are arranged to open at a fifth predetermined pressure and the fifth predetermined pressure is greater than the first predetermined pressure and less than the second predetermined pressure, the fuel flow valves, or restrictors, 39 for the main fuel nozzles 68 in the intermediate region E between the bottom region C of the annular combustion chamber 30 and the top region D of the annular combustion chamber 30 are arranged to open at a sixth predetermined pressure and the sixth predetermined pressure is greater than the third predetermined pressure and less than the fourth predetermined pressure.

The valves in the arrangements described above may be check valves, weight distributor valves, solenoid valves or any other suitable type of valve. The check valves have different crack, opening, pressures and the weight distributor valves have different spring tensions. The solenoid valves are operated electrically. The restrictors may have different area/diameters or may be active variable geometry orifices. The check valves and the weight distributor valves open when the fuel pressure reaches a predetermined value whereas the solenoid valves may be operated directly from a measurement of the temperature T40 at the downstream end of the combustion chamber, a determination of the temperature T40 at the downstream end of the combustion chamber, the speed of rotation of the high pressure shaft or the power e.g. EPR or IEPR and thus the solenoid valves in the first circumferential region are opened before the solenoid valves in the second circumferential region.

All of the methods described above include determining, or measuring, the temperature at a downstream end, exit, of the annular combustion chamber, switching from the first mode of operation to the second mode of operation when the temperature at the downstream end, exit, of the annular combustion chamber is equal to or greater than a predetermined temperature and switching from the second mode of operation to the first mode of operation when the temperature at a downstream end, exit, of the annular combustion chamber is less than the predetermined temperature. The predetermined temperature may be 1250° C. to 1550° C., e.g. 1500° C.

Alternatively, because the combustion chamber is arranged in a gas turbine engine 10, comprising a high pressure compressor 14 and a high pressure turbine 17 drivingly connected to the high pressure compressor 14 by a shaft 20, the high pressure compressor 14 supplying air to the annular combustion chamber 30, the method may include measuring the speed of rotation of the shaft 20 using one or more rotational speed sensors, e.g. phonic wheel, SS as shown in FIG. 1 and switching from the first mode of operation to the second mode of operation when the speed of rotation of the shaft 20 is equal to or greater than a predetermined rotational speed and switching from the second mode of operation to the first mode of operation when the speed of rotation of the shaft 20 is less than the predetermined rotational speed. The temperature T40 at the downstream end of the combustion chamber 30 may be determined, inferred, by measuring the speed of rotation of the high pressure shaft 20 using the phonic wheel or other rotational speed sensor SS. The temperature at the downstream end of the combustion chamber 30 is determined from the formula T40=f (High Pressure Shaft Speed). The control unit 43 uses the appropriate speed measurement to control the fuel splitter valve 41.

Alternatively, because the combustion chamber is arranged in a gas turbine engine 10, the method may include measuring the power, switching from the first mode of operation to the second mode of operation when the power is equal to or greater than a predetermined power and switching from the second mode of operation to the first mode of operation when the power is less than the predetermined power. The power produced by the turbofan gas turbine engine 10 is determined by using a pressure sensor PS3 to measure the pressure P20 at the intake 11 of the turbofan gas turbine engine 10, upstream of the fan 12 and a pressure sensor PS4 to measure the pressure P50 in the core engine flow downstream of the low pressure turbine 18 and upstream of the core exhaust nozzle 19 in order to measure the pressure ratio of the turbofan gas turbine engine 10. The pressure measurements from the sensor PS3 and PS4 are provided to the control unit 43 via suitable electrical connections. The engine pressure ratio (EPR) is P50/P20.

Alternatively, the integrated engine pressure ratio (IEPR) may be used which also uses a pressure sensor PS5 to measure the pressure P135 in the bypass duct 23 downstream of the fan outlet guide vanes and upstream of the bypass exhaust nozzle 25. The pressure measurements from the sensors PS3, PS4 and PS5 are provided to the control unit 43 via suitable electrical connections. The integrated engine pressure ratio (IEPR) is (A×P50/P20)+B×P135/P20) where A and B are chosen to sum to one and are related to the outlet areas of the core exhaust nozzle 19 and the bypass exhaust nozzle 25. The control unit 43 uses the appropriate pressure measurements to determine the EPR or the IEPR and then to control the fuel splitter valve 41.

The uneven, or biased, distribution of fuel to the pilot and main fuel nozzles may be optimised to maximise combustion efficiency.

Although the present disclosure has referred to eighteen fuel injectors it is equally possible to use other suitable numbers of fuel injectors.

Although the present disclosure has referred to two circumferential regions and three circumferential regions any suitable number of circumferential regions may be provided and each circumferential region may have one or more pilot fuel nozzles and a corresponding number of main fuel nozzles.

Although the present discourse has referred to a plurality of fuel injectors, each comprising a pilot fuel nozzle and a main fuel nozzle, it may be equally possible to use a plurality of fuel injectors each comprising a pilot nozzle only and a plurality of fuel injectors each comprising a main fuel nozzle only.

Although the present disclosure has referred to an annular combustion chamber having a plurality of circumferentially arranged apertures and each aperture having a respective one of a plurality of fuel injectors and each fuel injector comprises a pilot fuel nozzle and a main fuel nozzle it is possible to have other arrangements of annular combustion chamber, pilot fuel nozzles and main fuel nozzles.

The annular combustion chamber may comprises a double annular combustion chamber comprising a first annular upstream end wall, a second annular upstream end wall, a radially outer annular wall, a radially outer intermediate annular wall, a radially inner intermediate annular wall, a radially inner annular wall and a plurality of pilot fuel nozzles and a plurality of main fuel nozzles, the upstream ends of the radially outer annular wall and the radially outer intermediate annular wall being connected to the first annular upstream end wall, the upstream ends of the radially inner intermediate annular wall and the radially inner annular wall being connected to the second annular upstream end wall, the downstream end of the radially outer intermediate annular wall being connected to the downstream end of the radially inner intermediate annular wall, the first annular upstream end wall having a plurality of circumferentially spaced apertures, the second annular upstream end wall having a plurality of circumferentially spaced apertures, each aperture in the first annular upstream end wall having a respective one of the plurality of pilot fuel nozzles and each aperture in the second annular upstream end wall having a respective one of the plurality of main fuel nozzles or each aperture in the first annular upstream end wall having a respective one of the plurality of main fuel nozzles and each aperture in the second annular upstream end wall having a respective one of the plurality of pilot fuel nozzles.

Alternatively the annular combustion chamber may comprise an annular upstream end wall, a radially outer annular wall, a radially inner annular wall and a plurality of pilot fuel nozzles and a plurality of main fuel nozzles, the annular upstream end wall having a plurality of circumferentially spaced apertures, the radially outer annular wall or the radially inner annular wall having a plurality of circumferentially spaced apertures, each aperture in the annular upstream end wall having a respective one of the plurality of pilot fuel nozzles, each aperture in the radially outer annular wall or the radially inner annular wall having a respective one of the main fuel nozzles.

Although the present discourse has referred to a turbofan gas turbine engine it is equally applicable to a turbo-shaft gas turbine engine, a turbo-propeller gas turbine engine or a turbojet gas turbine engine.

Although the present disclosure has referred to an aero gas turbine engine it is equally applicable to an industrial gas turbine engine, a marine gas turbine engine or an automotive gas turbine engine.

Although the present disclosure has referred to specific ratios of fuel supplied to the pilot fuel manifold and the main fuel manifold during the first mode of operation and the second mode of operation it may be equally applicable to other ratios of fuel supplied to the pilot fuel manifold and the main fuel manifold during the first mode of operation and the second mode of operation.

The predetermined pressures at which the valves, restrictors and valves and restrictors open, e.g. the first predetermined pressure, the second predetermined pressure, the third predetermined pressure, the fourth predetermined pressure, the fifth predetermined pressure and the sixth predetermined pressure are fuel pressures.

Thus, the present disclosure increases the amount of time that the main fuel injectors are operating compared to the previous method. This reduces the number of times that the main fuel supply is switched on and off and hence it increases the life of the fuel splitter valve, which controls the supply of fuel to the pilot and main manifolds. The present disclosure makes use of an uneven, or biased, distribution of fuel around the annular combustion chamber to provide improved combustion efficiency and/or lower emissions at low exit temperature conditions, low speed conditions or low power conditions compared to an even distribution of fuel around the annular combustion chamber. The use of valves and/or restrictors to provide the uneven, biased, distribution of fuel to the pilot fuel nozzles and the main fuel nozzles enables a controlled, measured, known or exact, distribution of fuel. The present disclosure improves the weak extinction capability and the relight capability of the combustion chamber.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of operating a combustion chamber system, the combustion system comprising an annular combustion chamber, a pilot fuel manifold, at least one main fuel manifold, a plurality of circumferentially arranged pilot fuel nozzles and a plurality of circumferentially arranged main fuel nozzles, each pilot fuel nozzle being fluidly connected to the pilot fuel manifold, each main fuel nozzle being fluidly connected to the at least one main fuel manifold, and each of the plurality of main fuel nozzles being exterior and concentric to a respective one of the plurality of pilot fuel nozzles, the method comprising:

in a first mode of operation, supplying a greater total amount of fuel to the plurality of pilot fuel nozzles than to the plurality of main fuel nozzles and supplying a greater amount of fuel to one or more first pilot fuel nozzles of the plurality of pilot fuel nozzles at a first circumferential region of the annular combustion chamber than to one or more second pilot fuel nozzles of the plurality of pilot fuel nozzles at a second circumferential region of the annular combustion chamber and supplying a greater amount of fuel to one or more first main fuel nozzles of the plurality of main fuel nozzles at the first circumferential region of the annular combustion chamber than to one or more second main fuel nozzles of the plurality of main fuel nozzles at the second circumferential region of the annular combustion chamber, and in a second mode of operation, supplying a greater total amount of fuel to the plurality of main fuel nozzles than to the plurality of pilot fuel nozzles and supplying substantially the same amount of fuel to each of the plurality of pilot fuel nozzles and supplying substantially the same amount of fuel to each of the plurality of main fuel nozzles, wherein, in the first mode of operation, a first ratio of the amount of fuel supplied to the one or more second pilot fuel nozzles to the amount of fuel supplied to the one or more second main fuel nozzles is greater than a second ratio of the amount of fuel supplied to the one or more first pilot fuel nozzles to the amount of fuel supplied to the one or more first main fuel nozzles.

2. The method as claimed in claim 1 comprising providing fuel flow restrictors in the plurality of pilot fuel nozzles and fuel flow restrictors in the plurality of main fuel nozzles, the fuel flow restrictors in the one or more first pilot fuel nozzles being arranged to open at a first predetermined pressure and the fuel flow restrictors in the one or more second pilot fuel nozzles being arranged to open at a second predetermined pressure and the first predetermined pressure is less than the second predetermined pressure, the fuel flow restrictors in the one or more first main fuel nozzles being arranged to open at a third predetermined pressure and the fuel flow restrictors in the one or more second main fuel nozzles being arranged to open at a fourth predetermined pressure and the third predetermined pressure is less than the fourth predetermined pressure.

3. The method as claimed in claim 1 wherein the first circumferential region is at a bottom region of the annular combustion chamber and the second circumferential region is at a top region of the annular combustion chamber.

4. The method as claimed in claim 3 comprising providing fuel flow restrictors in the plurality of pilot fuel nozzles and fuel flow restrictors in the plurality of main fuel nozzles, the fuel flow restrictors in the one or more first pilot fuel nozzles being arranged to open at a first predetermined pressure and the fuel flow restrictors in the one or more second pilot fuel nozzles being arranged to open at a second predetermined pressure and the first predetermined pressure is less than the second predetermined pressure, the fuel flow restrictors in the one or more first main fuel nozzles being arranged to open at a third predetermined pressure and the fuel flow restrictors in the one or more second main fuel nozzles being arranged to open at a fourth predetermined pressure and the third predetermined pressure is less than the fourth predetermined pressure.

5. The method as claimed in claim 4 comprising supplying progressively smaller amounts of fuel to a plurality of third pilot fuel nozzles of the plurality of pilot fuel nozzles to transition between the one or more first pilot fuel nozzles and the one or more second pilot fuel nozzles, and supplying progressively smaller amounts of fuel to a plurality of third main fuel nozzles of the plurality of main fuel nozzles to transition between the one or more first main fuel nozzles and the one or more second main fuel nozzles in the first mode of operation.

6. The method as claimed in claim 5 wherein the fuel flow restrictors in the one or more third pilot fuel nozzles are arranged to open at a fifth predetermined pressure and the fifth predetermined pressure is greater than the first predetermined pressure and less than the second predetermined pressure, the fuel flow restrictors in the one or more third main fuel nozzles are arranged to open at a sixth predetermined pressure and the sixth predetermined pressure is greater than the third predetermined pressure and less than the fourth predetermined pressure.

7. The method as claimed in claim 3 wherein the at least one main fuel manifold comprises a single main fuel manifold and each main fuel nozzle of the plurality of main fuel nozzles is fluidly connected to the single main fuel manifold.

8. The method as claimed in claim 3 wherein the at least one main fuel manifold comprises a first main fuel manifold and a second main fuel manifold, the one or more first main fuel nozzles of the plurality of main fuel nozzles being fluidly connected to the first main fuel manifold and the one or more second main fuel nozzles of the plurality of main fuel nozzles being fluidly connected to the second main fuel manifold.

9. The method as claimed in claim 8 wherein the first main fuel manifold is arranged around an upper half of the annular combustion chamber and the second fuel manifold is arranged around a lower half of the annular combustion chamber.

10. The method as claimed in claim 9 comprising supplying a greater amount of fuel to the one or more first pilot fuel nozzles than to the one or more second pilot fuel nozzles, and supplying a greater amount of fuel from the second main fuel manifold to one or more first associated main fuel nozzles of the second subset of main fuel nozzles at the bottom region of the annular combustion chamber than to one or more second associated main fuel nozzles of the second subset of main fuel nozzles nearer to the top region of the annular combustion chamber, and supplying no fuel from the first fuel manifold to the first subset of main fuel nozzles in the first mode of operation.

11. The method as claimed in claim 10 comprising supplying 70% to 90% of the fuel to the plurality of pilot fuel nozzles and supplying 30% to 10% of the fuel to the plurality of main fuel nozzles in the first mode of operation and supplying 5% to 25% of the fuel to the plurality of pilot fuel nozzles and supplying 95% to 75% of the fuel to the plurality of main fuel nozzles in the second mode of operation.

12. The method as claimed in claim 1 comprising supplying 70% to 90% of the fuel to the plurality of pilot fuel nozzles and supplying 30% to 10% of the fuel to the plurality of main fuel nozzles in the first mode of operation and supplying 5% to 25% of the fuel to the plurality of pilot fuel nozzles and supplying 95% to 75% of the fuel to the plurality of main fuel nozzles in the second mode of operation.

13. The method as claimed in claim 1 wherein an axis of the annular combustion chamber is arranged substantially horizontally.

14. The method as claimed in claim 1 wherein the annular combustion chamber comprises a plurality of circumferentially spaced fuel injectors, each fuel injector of the plurality of fuel injectors comprising one of the plurality of pilot fuel nozzles and one of the plurality of main fuel nozzles.

15. The method as claimed in claim 1 comprising providing fuel flow valves in the plurality of pilot fuel nozzles and fuel flow valves in the plurality of main fuel nozzles, the fuel flow valves in the one or more first pilot fuel nozzles being arranged to open at a first predetermined temperature, speed or power and the one or more second pilot fuel nozzles being arranged to open at a second predetermined temperature, speed or power and the first predetermined temperature, speed or power is less than the second predetermined temperature, speed or power, the fuel flow valves in the one or more first main fuel nozzles being arranged to open at a third predetermined temperature, speed or power and the one or more second main fuel nozzles being arranged to open at a fourth predetermined temperature, speed or power and the third predetermined temperature, speed or power is less than the fourth predetermined temperature, speed or power.

16. The method as claimed in claim 15 wherein the fuel flow valves are solenoid valves.

17. A method of operating a combustion chamber system, the combustion system comprising an annular combustion chamber, a pilot fuel manifold, at least one main fuel manifold, a plurality of circumferentially arranged pilot fuel nozzles and a plurality of circumferentially arranged main fuel nozzles, each pilot fuel nozzle being fluidly connected to the pilot fuel manifold, each main fuel nozzle being fluidly connected to the at least one main fuel manifold, and each of the plurality of main fuel nozzles being exterior and concentric to a respective one of the plurality of pilot fuel nozzles, the method comprising:

in a first mode of operation, supplying a greater total amount of fuel to the plurality of pilot fuel nozzles than to the plurality of main fuel nozzles and supplying fuel to the plurality of pilot fuel nozzles and the plurality of main fuel nozzles such that a first ratio of the amount of fuel supplied to one or more second pilot fuel nozzles of the plurality of pilot fuel nozzles at a second circumferential region of the annular combustion chamber to the amount of fuel supplied to one or more second main fuel nozzles of the plurality of main fuel nozzles at the second circumferential region of the annular combustion chamber is greater than a second ratio of the amount of fuel supplied to one or more first pilot fuel nozzles of the plurality of pilot fuel nozzles at a first circumferential region of the annular combustion chamber to the amount of fuel supplied to one or more first main fuel nozzles of the plurality of main fuel nozzles at the first circumferential region of the annular combustion chamber, and in a second mode of operation, supplying a greater total amount of fuel to the plurality of main fuel nozzles than to the plurality of pilot fuel nozzles, and supplying substantially the same amount of fuel to each of the plurality of pilot fuel nozzles and supplying substantially the same amount of fuel to each of the plurality of main fuel nozzles.

18. A combustion chamber system comprising:
an annular combustion chamber,
a pilot fuel manifold,
at least one main fuel manifold,
a plurality of circumferentially arranged pilot fuel nozzles and a plurality of circumferentially arranged main fuel nozzles, each pilot fuel nozzle being fluidly connected to the pilot fuel manifold, each main fuel nozzle being fluidly connected to the at least one main fuel manifold, and each of the plurality of main fuel nozzles being exterior and concentric to a respective one of the plurality of pilot fuel nozzles, and
a fuel flow restrictor for each pilot fuel nozzle of the plurality of pilot fuel nozzles and a fuel flow restrictor for each main fuel nozzle of the plurality of main fuel nozzles, the fuel flow restrictors for first pilot fuel nozzles of the plurality of pilot fuel nozzles at a first circumferential region of the annular combustion chamber being arranged to open at a first predetermined pressure and the fuel flow restrictors for second pilot fuel nozzles of the plurality of pilot fuel nozzles at a second circumferential region of the annular combustion chamber being arranged to open at a second predetermined pressure and the first predetermined pressure is less than the second predetermined pressure, the fuel flow restrictors for first main fuel nozzles of the plurality of main fuel nozzles at the first circumferential region of the annular combustion chamber being arranged to open at a third predetermined pressure and the fuel flow restrictors for second main fuel nozzles of the plurality of main fuel nozzles at the second circumferential region of the annular combustion chamber being arranged to open at a fourth predetermined pressure and the third predetermined pressure is less than the fourth predetermined pressure, wherein, in a first mode of operation, the system is configured to supply a greater total amount of fuel to the plurality of pilot fuel nozzles than to the plurality of main fuel nozzles, and a first ratio of the amount of fuel supplied to the second pilot fuel nozzles to the amount of fuel supplied to the second main fuel nozzles is greater than a second ratio of the amount of fuel supplied to the first pilot fuel nozzles to the amount of fuel supplied to the first main fuel nozzles, and wherein, in a second mode of operation, the system is configured to supply a greater total amount of fuel to the plurality of main fuel nozzles than to the plurality of pilot fuel nozzles and to supply substantially the same amount of fuel to each of the plurality of pilot fuel nozzles and to supply substantially the same amount of fuel to each of the plurality of main fuel nozzles.

* * * * *